(12) United States Patent
Tsuchiya et al.

(10) Patent No.: US 7,460,199 B2
(45) Date of Patent: Dec. 2, 2008

(54) LIQUID CRYSTAL DISPLAY DEVICE, METHOD OF MANUFACTURING LIQUID CRYSTAL DISPLAY DEVICE, AND ELECTRONIC APPARATUS

(75) Inventors: Hitoshi Tsuchiya, Suwa (JP); Joji Nishimura, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/543,816

(22) Filed: Oct. 6, 2006

(65) Prior Publication Data

US 2007/0024785 A1 Feb. 1, 2007

Related U.S. Application Data

(63) Continuation of application No. 10/992,806, filed on Nov. 22, 2004.

(30) Foreign Application Priority Data

Dec. 10, 2003 (JP) ............................. 2003-411844
Aug. 23, 2004 (JP) ............................. 2004-242076

(51) Int. Cl.
*G00F 1/1337* (2006.01)
(52) U.S. Cl. .................. 349/123; 349/124; 349/125; 349/126; 349/127; 349/128; 349/129; 349/130; 349/110
(58) Field of Classification Search ......... 349/123–130, 349/110
See application file for complete search history.

(56) References Cited

U.S. PATENT DOCUMENTS

| | | | |
|---|---|---|---|
| 5,850,271 A | 12/1998 | Dudek | |
| 6,522,377 B2 | 2/2003 | Chowdhury | |
| 6,567,144 B1 * | 5/2003 | Kim et al. | 349/128 |

| | | | |
|---|---|---|---|
| 6,788,375 B2 | 9/2004 | Ogishima et al. | |

(Continued)

FOREIGN PATENT DOCUMENTS

JP A-11-242225 9/1999

(Continued)

OTHER PUBLICATIONS

Jisaki et al., "Development of transflective LCD for high contrast and wide viewing angle by using homeotropic alignment", *Asia Display/IDS* '01 (2001), pp. 133-136.

*Primary Examiner*—David C. Nelms
*Assistant Examiner*—Thanh-Nhan P Nguyen
(74) *Attorney, Agent, or Firm*—Oliff & Berridge, PLC

(57) ABSTRACT

To provide a liquid crystal display device and an electronic apparatus in which deterioration of contrast due to a protrusion or a slit used for division of alignment can be prevented in the liquid crystal display device including a liquid crystal which has a negative dielectric anisotropy exhibiting vertical alignment as an initial alignment state. There is provided a liquid crystal display device comprising a liquid crystal layer, which includes a liquid crystal having a negative dielectric anisotropy exhibiting vertical alignment as an initial alignment state, between a pair of substrates and disposed to be opposite to each other, in which alignment control means for controlling alignment of the liquid crystal layer is provided on at least one of electrodes provided on the pair of substrates, and in which a light-shielding film BM two-dimensionally overlapped with the alignment control means is provided on at least one substrate of the pair of substrates.

3 Claims, 11 Drawing Sheets

U.S. PATENT DOCUMENTS

| | | | |
|---|---|---|---|
| 6,839,104 B2 | 1/2005 | Taniguchi et al. | |
| 7,167,225 B2 * | 1/2007 | Kim | 349/139 |
| 2001/0040656 A1 | 11/2001 | Na et al. | |
| 2002/0039166 A1 | 4/2002 | Song | |
| 2002/0075436 A1 | 6/2002 | Kubo et al. | |
| 2002/0080320 A1 | 6/2002 | Suzuki et al. | |
| 2004/0041963 A1 * | 3/2004 | Ogishima et al. | 349/110 |
| 2004/0125297 A1 * | 7/2004 | Lee | 349/129 |
| 2005/0024559 A1 | 2/2005 | Okumura | |
| 2005/0195343 A1 | 9/2005 | Bang et al. | |
| 2006/0038948 A1 | 2/2006 | Nishikawa et al. | |

FOREIGN PATENT DOCUMENTS

| | | |
|---|---|---|
| JP | A-2001-194671 | 7/2001 |
| JP | 2002-014349 A | 1/2002 |
| JP | A-2002-162627 | 6/2002 |
| JP | A-2002-202511 | 7/2002 |
| JP | A-2002-287158 | 10/2002 |
| JP | 2004-093846 A | 3/2004 |
| KR | A-2001-0096153 | 11/2001 |
| KR | 2002-0040544 A | 5/2002 |
| KR | A-2002-0033586 | 5/2002 |
| KR | A-2002-0079583 | 10/2002 |
| KR | 2003-0058012 | 7/2003 |

* cited by examiner

US 7,460,199 B2

LIQUID CRYSTAL DISPLAY DEVICE, METHOD OF MANUFACTURING LIQUID CRYSTAL DISPLAY DEVICE, AND ELECTRONIC APPARATUS

This is a Continuation of application Ser. No. 10/992,806 filed Nov. 22, 2004, which claims priority from Japanese Patent Application No. 2003-411844 filed Dec. 10, 2003 and Japanese Patent Application No. 2004-242076 filed Aug. 23, 2004. The disclosures of the prior applications are hereby incorporated by reference in their entirety.

BACKGROUND

The present invention relates to a liquid crystal display device and an electronic apparatus.

Conventionally, as a mode most widely used in liquid crystal display devices, there is known a twisted nematic (TN) mode which is a normally-white mode. Recently, the TN-mode liquid crystal display devices have been advanced remarkably and image quality thereof has been improved up to the same level as CRT. However, the TN-mode liquid crystal display devices have a serious disadvantage that the viewing angle is narrow. A vertical alignment (VA) mode in which liquid crystal having a negative dielectric anisotropy is vertically aligned between a pair of substrates opposite to each other solved the disadvantage. The vertical alignment mode is currently applied to liquid crystal televisions, etc. to come in the market. The VA-mode liquid crystal display devices have characteristics of a wide viewing angle and a high contrast.

In the VA-mode liquid crystal display devices, there has been known that the wide viewing angle can be realized by employing a structure for dividing an alignment direction of liquid crystal molecules into a plurality of different directions in pixels. Here, examples of a specific structure for performing the alignment division include a structure where slits are formed in a transparent electrode such as ITO, etc. and a structure where protrusion portions are formed on the transparent electrode. There is disclosed a technique of controlling a direction in which the vertically-aligned liquid crystal falls down at the time of application of voltage, by providing the slits or protrusion portions (for example, see Patent Document 1).

Furthermore, in a conventional transflective liquid crystal display device, there was a problem that the viewing angle is narrow in transmissive display. This is because there is a restriction that reflective display should be performed only with one sheet of polarizing plate provided at an observer side since a transflective plate is provided on the inner surface of liquid crystal cells so as not to generate parallax, thereby reducing a degree of freedom in optical design. Therefore, in order to solve this problem, Jisaki et al suggested a new liquid crystal display device employing vertically-aligned liquid crystal in Non-Patent Document 1 described below. Features thereof are as follows:

(1) A "Vertical Alignment (VA) mode" is employed in which liquid crystal having a negative dielectric anisotropy is aligned vertically to a substrate and the vertically-aligned liquid crystal falls down due to application of voltage.

(2) A "multi gap structure" is employed in which the thickness (cell gap) of the liquid crystal layer is different in the transmissive display area and the reflective display area.

(3) The transmissive display area is formed in a regular octagon and a center of the transmissive display area on a counter substrate is provided with a protrusion so that the liquid crystal falls down in all directions. That is, an "alignment division (multi domain) structure" is employed.

Although in the above document, the protrusion is used as alignment control means for controlling the direction in which the liquid crystal falls down, there has also been a technique that an electric field is deformed by providing a slit in an electrode and the direction in which the liquid crystal falls down is controlled due to the deformation of the electric field.

There is also a transmissive liquid crystal display device employing the vertical alignment mode. Specifically, for example, a wide viewing angle is realized by dividing one pixel into a plurality of sub-pixels and forming convex portions at centers of respective sub-pixels on the counter substrate to make one pixel to multi domains (for example, see Patent Document 2). Features thereof are as follows:

(1) One pixel is divided into a plurality of sub-pixels.

(2) The shapes of the sub-pixels have a rotational symmetry (for example, circular shape, square shape, pentagonal shape, etc.).

(3) In addition to the shapes of (2), by providing a convex portion at the center of the opened portion or the sub-pixel, the liquid crystal molecules are aligned in a radial shape from the center, thereby enhancing the alignment control power.

(4) By adding chiral agent, the direction in which the liquid crystal is twisted is controlled, thereby preventing spotty stains due to the alignment failure.

[Patent Document 1] Japanese Unexamined Patent Application Publication No. 11-242225

[Patent Document 2] Japanese Unexamined Patent Application Publication No. 2002-202511

[Non-Patent Document 1] "Development of transflective LCD for high contrast and wide viewing angle by using homeotropic alignment", M. Jisaki et al., Asia Display/IDW'01, p. 133-136 (2001)

SUMMARY

Paying attention to the liquid crystal material on the protrusion portion used for the division of alignment, the liquid crystal molecules on the protrusion portion is not completely vertical to the substrate but has a slope depending upon the slope of the protrusion portion. There is a problem that birefringence occurs and light is leaked due to the inclination of the liquid crystal molecules, thereby causing deterioration of contrast.

Also in the boundaries of the slit provided in the transparent electrode, there is a problem that a fringe effect in which equipotential lines of the slit boundaries become dense occurs and specifically when an OFF potential for drive is 0 V or more, the liquid crystal molecules are slightly inclined due to a weak electric field, thereby causing the deterioration of contrast.

According to the techniques disclosed in the conventional technical document, by employing the aforementioned structure (the oblique electric field due to the slits or protrusions disposed up and down, or the alignment control through a free tilt due to the protruded shape) to make a multi domain, a display with a wide viewing angle can be realized, but these techniques have the following problems. That is, since the alignment control means such as slits, protrusions, etc. are provided on the upper and lower substrates, the alignment state of the liquid crystal molecules around the alignment control means is different from that of other areas, so that there is a problem that light is leaked at the time of application of voltage, thereby deteriorating contrast. Further, when the protrusions are formed as the alignment control means, the alignment controllability at the time of application of voltage becomes good with increase in height of the protrusions, so that a response speed is enhanced but leakage of light is increased remarkably.

The present invention is made in consideration of the conventional problems, and it is an object of the present invention to provide a liquid crystal display device and an electronic apparatus, which can prevent deterioration of contrast due to alignment control of vertically-aligned liquid crystal and thus can realize a high-quality display with wide viewing angle and high contrast.

In order to accomplish the above object, the present invention employs the following structures.

A liquid crystal display device according to an aspect of the present invention comprises a liquid crystal layer, which includes liquid crystal having a negative dielectric anisotropy exhibiting vertical alignment as an initial alignment state, between a pair of substrates disposed to be opposite to each other, in which alignment control means for controlling alignment of the liquid crystal is provided on at least one substrate of the pair of substrates, and in which a light-shielding film two-dimensionally overlapped with the alignment control means is disposed at a position corresponding to the alignment control means on at least one substrate of the pair of substrates.

According to this structure, since the light-shielding means is provided at a position two-dimensionally overlapped with the alignment control means, the leaked light resulting from the oblique alignment of liquid crystal molecules, etc. due to the alignment control means can be prevented from being observed by a user. Therefore, it is possible to effectively prevent deterioration of contrast due to the leaked light, thereby obtaining a display with wide viewing angle and high contrast.

Since the liquid crystal display device according to the present invention has the alignment control means, the alignment direction of the liquid crystal having a vertical alignment mode at the time of application of voltage can be preferably controlled. A negative liquid crystal is usually used when the vertical alignment mode is employed. However, since the liquid crystal molecules vertical to the substrate surface in an initial alignment state are made to fall down with application of voltage, the direction in which the liquid crystal molecules fall down cannot be controlled without any scheme and thus unevenness of alignment occurs, so that a display characteristic is deteriorated. For this reason, the control of alignment direction of the liquid crystal molecules at the time of application of voltage is important for employing the vertical alignment mode.

Therefore, in the liquid crystal display device according to the present invention, since the alignment control means is formed on the interposed surface of the liquid crystal layer, it is possible to regulate or control the direction in which the liquid crystal molecules fall down, so that the unevenness of alignment is difficult to occur, display defects such as after-image, spotty stains, etc. are repressed, and the wide viewing angle can be realized.

In the liquid crystal display device according to the present invention, since the light-shielding film is formed at the position corresponding to the alignment control means as well as providing the alignment control means, the light-shielding film prevents the leakage of light and thus prevents the deterioration of contrast, even when birefringence occurs around the alignment control means due to the inclination of the liquid crystal molecules. Therefore, it is possible to realize a display with high contrast.

It is preferable that the light-shielding film is formed at the position corresponding to the protrusion portion in the alignment control means. In the vicinity of the protrusion portion, since the slope of the liquid crystal molecules is larger than that in the vicinity of the slit portion and thus the birefringence occurs largely, the leakage of light is increased. Therefore, it is possible to efficiently repress the leakage of light only by forming the light-shielding film at the position corresponding to the protrusion portion.

Here, it is preferable that a specific structure of the alignment control means includes a dielectric protrusion formed on an electrode, and/or an electrode opening portion formed by cutting out a part of the electrode.

Specifically, when the alignment control means includes the dielectric protrusion, the liquid crystal molecules on the dielectric protrusion are also aligned obliquely about the substrate surface in a case of a black display, so that the deterioration of contrast tends to occur due to the leaked light. However, in the present invention, since the leaked light is effectively intercepted by the light-shielding film, it is possible to obtain a display with excellent contrast.

In the above liquid crystal display device, the light-shielding film may be formed only on one substrate of the pair of substrates.

According to this structure, as well as to obtain the same advantages as the liquid crystal display device described above, it is possible to provide a liquid crystal display device at lower cost than that of the structure that the light-shielding film has been provided on each of the pair of substrates.

In the above liquid crystal display device, the light-shielding film and the alignment control means may be formed on the same substrate.

According to this structure, as well as to obtain the same advantages as the liquid crystal display device described above, it is possible to allow the position of the light-shielding film to correspond to the position of the alignment control means with high accuracy.

When the light-shielding film and the alignment control means are formed on the same substrate, they are formed using a photolithography technique, etc. with high accuracy so as to correspond to both positions. On the contrary, when the light-shielding film and the alignment control means are formed on the pair of substrates, respectively, it is possible to form a seal member on one substrate and then to bond the pair of substrates through the seal member. Here, it is required that the positions of the light-shielding film and the alignment control means are matched with high accuracy, and it is difficult to position them.

Therefore, by forming the light-shielding film and the alignment control means on the same substrate, an error in bonding the substrates can be neglected and the positions of the light-shielding film and the alignment control means can be matched with high accuracy.

The two-dimensional size of the light-shielding film is slightly larger than that of the alignment control means in consideration of the positioning accuracy to the alignment control means, but since the positioning accuracy between both is increased in the present structure, the two-dimensional measure of the light-shielding film can be reduced, so that it is possible to enhance an aperture ratio of the pixels. Accordingly, it is possible to obtain a bright display.

In the liquid crystal display device according to the present invention, one of the pair of substrates may be an element substrate comprising an electrode, a switching element connected to the electrode, and a signal line connected to the switching element. The light-shielding film may be provided on the element substrate and may be made of the same material as a material of the switching element or the signal line.

As a result, since the light-shielding means can be formed at the same time as forming the switching element, it is possible to enhance the display contrast without increasing the process load, compared with the conventional case.

In this case, a method of manufacturing the liquid crystal display device comprises: an element forming step of forming an electrode, a switching element connected to the electrode, a signal line connected to the switching element on one substrate of the pair of substrates; a step of forming at least an electrode on the other substrate; and a step of providing alignment control means for controlling the alignment state of the liquid crystal layer on any one of the pair of substrates. In the element forming step, a light-shielding film which is two-dimensionally overlapped with the alignment control means in a state where the pair of substrates are disposed to be opposite to each other, is formed at the same time as forming a constituent member of the switching element or the signal line.

According to this manufacturing method, since the light-shielding film is formed together with the constituent member of the switching element in the step of forming the switching element, it is possible to manufacture the liquid crystal display device with high contrast, without increasing the process load.

In the liquid crystal display device according to the present invention, one of the pair of substrates may comprise a color filter having a plurality of colored portions arranged therein as well as the light-shielding film, and the light-shielding film may be made of the same material as a light-shielding member partitioning the colored portions.

According to this structure, since the light-shielding film can be formed through the same step as forming the light-shielding member included in the color filter, it is possible to realize the liquid crystal display device capable of performing a color display with high contrast, without increasing the process load, also in the structure comprising the color filter.

In this case, a method of manufacturing the liquid crystal display device comprises: a color-filter forming step of forming a color filter having a plurality of colored portions which are two-dimensionally defined by a light-shielding member on one substrate of the pair of substrates; a step of forming an electrode on the color filter; a step of forming at least an electrode on the other substrate; and a step of providing alignment control means for controlling an alignment state of the liquid crystal layer on any one electrode of the pair of substrates. In the color-filter forming step, a light-shielding film which is two-dimensionally overlapped with the alignment control means in a state where the pair of substrates are disposed to be opposite to each other, is formed at the same time as forming the light-shielding member.

According to this manufacturing method, since the light-shielding means is formed together with the light-shielding member constituting the color filter in the color filter forming step, it is possible to manufacture the color liquid crystal display device with high contrast, without increasing the process load.

In the above liquid crystal display device, the light-shielding film which is formed on the substrate, in which light is incident on the liquid crystal layer, among the pair of substrates may be made of metal having a light-reflecting property.

As a result, since the light-shielding film has a function of reflecting the light as well as the function of shielding the light leaked around the alignment control means, the light incident on the light-shielding film is reflected, is restored to the backlight, and is reused as the exit light. That is, usage efficiency of light can be enhanced, so that it is possible to accomplish the enhancement of brightness.

In the liquid crystal display device according to the present invention, a transmissive display area for performing transmissive display and a reflective display area for performing reflective display may be provided in one dot area, and the thickness of the liquid crystal layer may be made different in both areas by a liquid-crystal-layer thickness adjusting layer formed in the dot area.

That is, the present invention can be applied to a transflective liquid crystal display device with a multi gap scheme. According to this structure, in addition to obtaining an excellent display from the reflective display and the transmissive display with the multi gap scheme, the deterioration of contrast due to the leaked light can be effectively prevented by the light-shielding means, so that it is possible to provide a liquid crystal display device capable of performing the reflective display and the transmissive display with high contrast and wide viewing angle.

In the liquid crystal display device according to the present invention, an electrode opposite to the alignment control means through the liquid crystal layer may include a plurality of island-shaped portions having a shape of a circle, an ellipse, or a polygon, and connection portions for connecting the plurality of island-shaped portions in one dot area.

According to this structure, a liquid crystal domain having a radial shape as seen two-dimensionally can be formed in the respective shape portions at the time of application of voltage, due to distortion of the electric field at side edges of the respective shape portions, so that it is possible to provide a liquid crystal display device capable of performing a display with high contrast in all directions.

In this structure, it is preferable that the alignment control means is disposed at the center of one of the circle, the ellipse, and the polygon as seen two-dimensionally.

According to this structure, a liquid crystal domain having the liquid crystal molecules aligned substantially in a radial shape from the center of the respective shape portions can be formed in one dot area, so that it is possible to effectively prevent spotty stains from being generated due to the alignment failure of the vertically-aligned liquid crystal. Therefore, it is possible to provide a liquid crystal display device capable of performing a high-contrast display with a wide viewing angle.

An electronic apparatus according to the present invention comprises the liquid crystal display device described above.

Here, examples of the electronic apparatus can include an information-processing apparatus such as a mobile phone, a mobile terminal device, a watch, a word processor, a personal computer, etc.

Therefore, according to the present invention, since the display unit employing the aforementioned liquid crystal display device is provided, it is possible to realize an electronic apparatus comprising a display unit having wide viewing angle and excellent display quality.

DETAILED DESCRIPTION OF EMBODIMENTS

First Embodiment

Hereinafter, a first embodiment of the present invention will be described with reference to the drawings. In the respective drawings, in order to recognize respective layers and respective members from the drawings, the respective layers and the respective members are illustrated with different scales.

A liquid crystal display device according to the present embodiment to be described hereinafter is an example of an active matrix liquid crystal display device using a thin film diode (hereinafter, abbreviated as TFD) as a switching element and is specifically a transmissive liquid crystal display device performing transmissive display.

Figure 1:
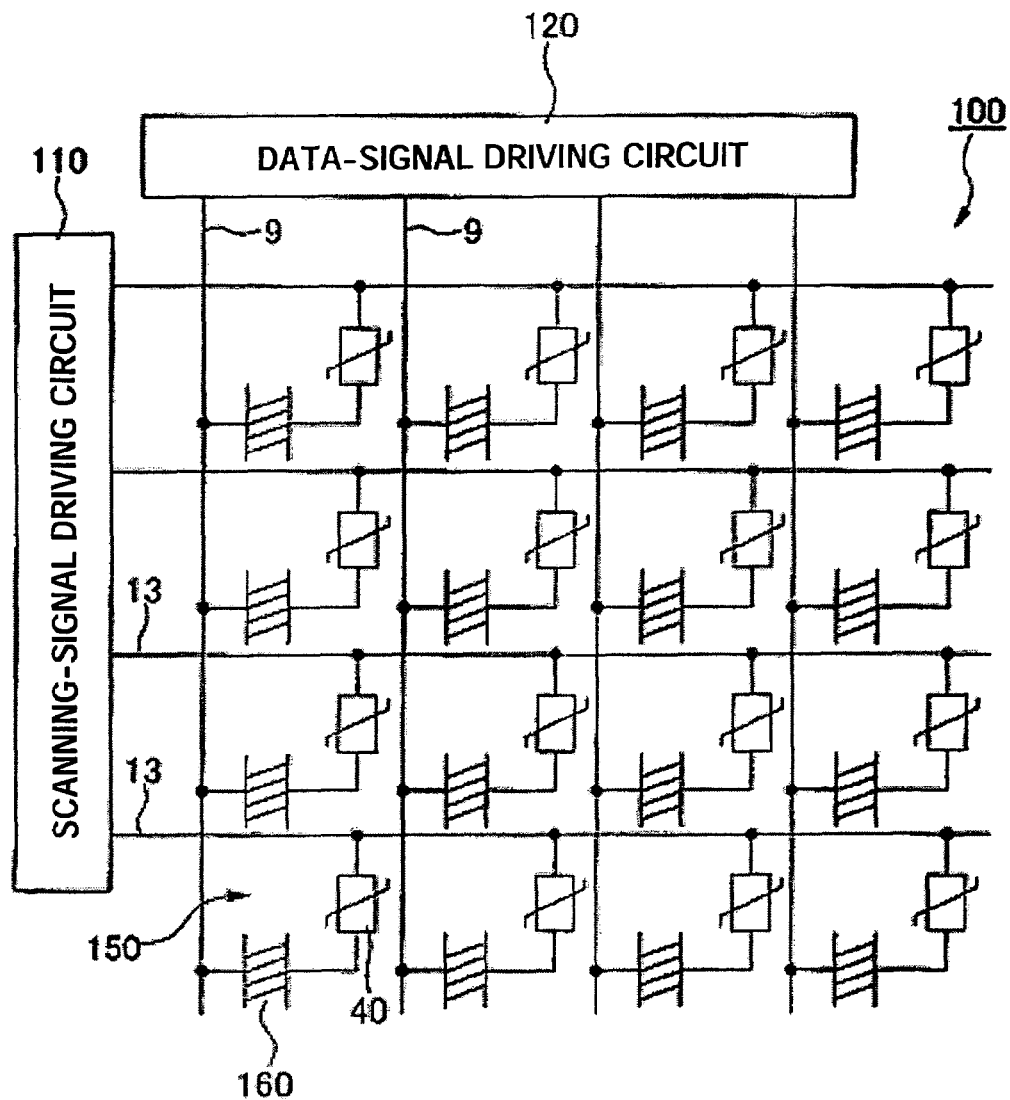
FIG. 1 is an equivalent circuit diagram of a liquid crystal display device according to a first embodiment of the present invention.

FIG. 1 illustrates an equivalent circuit of a liquid crystal display device 100 according to the present embodiment. The liquid crystal display device 100 comprises a scanning-signal driving circuit 110 and a data-signal driving circuit 120. Signal lines, that is, a plurality of scanning lines 13, and a plurality of data lines 9 intersecting the scanning liens 13 are provided in the liquid crystal display device 100. The scanning lines 13 are driven with the scanning-signal driving circuit 110 and the data lines 9 are driven with the data-signal driving circuit 120. In each pixel area 150, a TFD (thin film diode) element 40 and a liquid crystal display element 160 are connected in series between the scanning line 13 and the data line 9. In FIG. 1, the TFD element 40 is connected to the scanning line 13 side and the liquid crystal display element 160 is connected to the data line 9 side. On the contrary, the TFD element 40 may be connected to the data line 9 side and the liquid crystal display element 160 may be connected to the scanning line 13 side.

Figure 2:
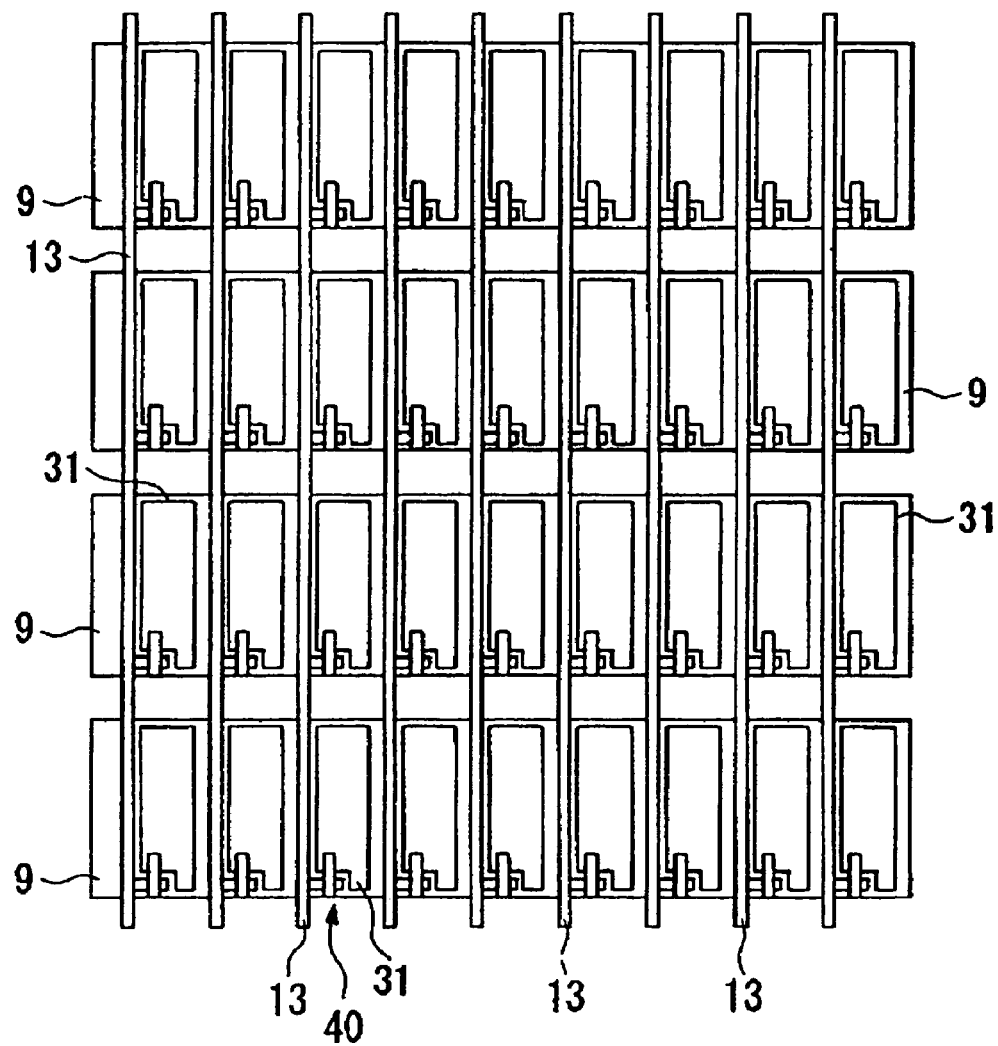
FIG. 2 is a plan view illustrating a structure of one dot area of the liquid crystal display device according to the first embodiment of the present invention.

Next, a two-dimensional structure (pixel structure) of electrodes provided in the liquid crystal display device 100 according to the present embodiment will be described with reference to FIG. 2. As shown in FIG. 2, in the liquid crystal display device 100 according to the present embodiment, pixel electrodes 31 having a rectangular shape as seen two-dimensionally and connected to the scanning lines 13 through the TFD elements 40 are provided in a matrix shape, and common electrodes 9 opposite to the pixel electrodes 31 in a direction perpendicular to the paper surface are provided in a longitudinal shape (stripe shape). The common electrodes 9 are formed out of the data lines and the have a stripe shape intersecting the scanning lines 13. In the present embodiment, respective areas formed with a pixel electrode 31 constitute one dot area, respectively, the TFD elements 40 are provided in the respective dot areas arranged in a matrix shape, and a display can be performed every dot area.

Here, the TFD elements 40 serve as switching elements connecting the scanning lines 13 and the pixel electrodes 31. Each TFD element 40 has a MIM structure comprising a first conductive film containing Ta as a major component, an insulating film formed on the surface of the first conductive film and containing $Ta_2O_3$ as a major component, and a second conductive film formed on the surface of the insulating film and containing Cr as a major component. The first insulating film of each TFD element 40 is connected to the scanning line 13 and the second conductive film is connected to the pixel electrode 31.

Figure 3:
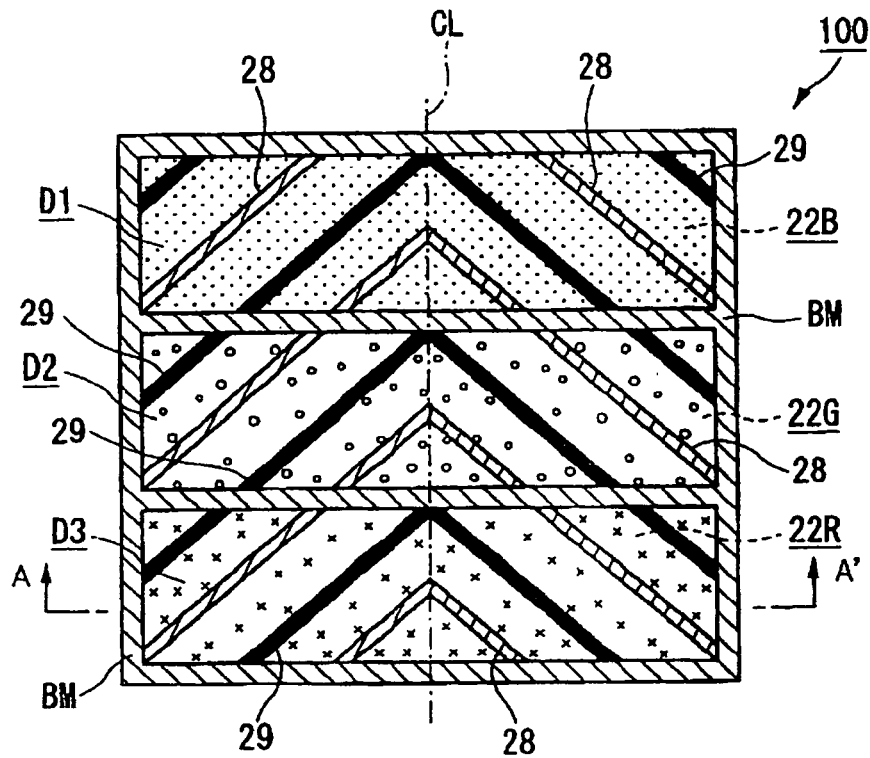
FIG. 3a shows a schematic plan view and FIG. 3b shows a schematic cross-sectional view of one dot area of the liquid crystal display device according to the first embodiment of the present invention.
Figure 3:
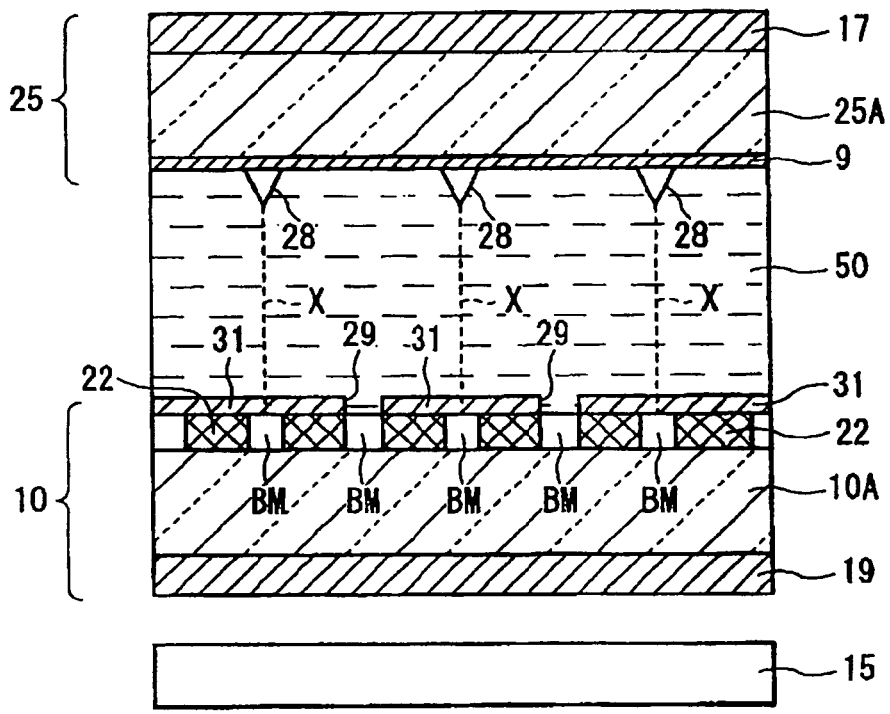

Next, structures of main parts of the liquid crystal display device 100 according to the present embodiment will be described with reference to FIG. 3.

FIG. 3(a) is a schematic diagram illustrating a pixel structure of the liquid crystal display device 100, particularly, a two-dimensional structure of the pixel electrode 31, and FIG. 3(b) is a schematic diagram illustrating a cross-section taken along a line A-A' of FIG. 3(a).

FIG. 3(b) is a diagram illustrating a cross-section of a red coloring layer 22R as a representative of the coloring layers 22, and the cross-sections of the other coloring layers 22B and 22G have the same structure, except that colors of the coloring layers are different.

The liquid crystal display device 100 according to the present embodiment has, as shown in FIG. 2, the dot areas, each dot area including a pixel electrode 31 inside the area surrounded with the data line 9 and the scanning line 13. In the dot areas, as shown in FIG. 3(a), one coloring layer of three primary colors is provided correspondingly to one data area, and three dot areas D1, D2 and D3 form a pixel including the coloring layers 22B (blue), 22G (green), and 22R (red). Protrusion portions 28 and slit portions 29 corresponding to the alignment control means according to the present invention are provided in the respective dot areas D1, D2, and D3. The protrusion portions 28 and the slit portions 29 have patterns symmetric about a central line CL and are arranged adjacent to each other. Here, the direction in which the protrusion portions 28 and the slit portions 29 extend forms an angle of 45° together with the central line CL. Accordingly, the direction in which the liquid crystal molecules fall down at the time of application of voltage to the liquid crystal layer 50 can be controlled at 45° about a transmission axis of a polarizing plate.

Although three dot areas adjacent each other are shown in FIG. 3(a), the TFD element 40 is provided in each dot area and the voltage can be applied to each liquid crystal display element 160 in every dot area.

On the other hand, as shown in FIG. 3(b), in the liquid crystal display device 100 according to the present embodiment, the liquid crystal layer 50 made of liquid crystal material of which an initial alignment state is vertical alignment, that is, liquid crystal material having a negative dielectric anisotropy is interposed between an upper substrate 25 and a lower substrate 10 disposed to be opposite to the upper substrate.

The lower substrate 10 has a structure that various layers and films are stacked on a substrate body 10A made of transparent material such as quartz, glass, etc.

The color filter 22 (red coloring layer 22R in FIG. 3(b)) is provided on the surface of the substrate body 10A opposite to the upper substrate 25.

Black matrixes (light-shielding films) BM having a predetermined two-dimensional pattern are formed adjacently to the color filter 22 on the same surface of the substrate body 10A. The black matrix BM is provided to surround the circumferential edges of the coloring layer 22R as shown in FIG. 3(a), and boundaries of the respective dot areas D1, D2, and D3 are formed by the black matrix BM.

Pixel electrodes 31 having a matrix shape and made of a transparent conductive film such as indium tin oxide (hereinafter, abbreviated as ITO), etc. are formed on the color filter 22 and the black matrix BM, and the pixel electrode 31 is provided with the slit portions 29 as the alignment control means. As shown in FIG. 2, the pixel electrode 31 is connected to the scanning line 13 through the TFD element 40 and applies the voltage to the liquid crystal layer 50 in accordance with the voltage supplied to the scanning line 13. An alignment film (not shown) is provided to cover the pixel electrodes 31 and the stepped portions provided with the slit portions 29.

Here, the alignment film made of material such as polyimide, etc., serves as a vertical alignment film for aligning the liquid crystal molecules vertically to the film surface, and is not subjected to an alignment process such as a rubbing process, etc. In the liquid crystal display device employing vertically-aligned liquid crystal molecules (liquid crystal molecules having a negative dielectric anisotropy) in which the division alignment is carried out without performing the rubbing process, it is necessary to suitably distort an electric field in a pixel and thus to control the direction in which the liquid crystal molecules fall down, by partially providing an electrode opening or a dielectric on an electrode inside the pixel. When the alignment control of liquid crystal molecules is not sufficient, the liquid crystal molecules fall down in random directions in a plane while maintaining a domain having some size. In this state, areas having different viewing angles occur in an in-plane part of a display area, thereby causing a display failure of spotty stains. Therefore, in order to control the alignment of the liquid crystal molecules of the liquid crystal layer 50, that is, in order to regulating the direction in which the liquid crystal molecules having the vertical alignment in the initial state fall down when the voltage is applied between the electrodes, the slit portions 29 or the protrusion portions 28 as the alignment control means are provided.

Next, the upper substrate 25 has a structure that various layers and films are stacked on a substrate body 25A made of transparent material such as quartz, glass, etc. On the surface of the substrate body 25A opposite to the lower substrate 10, the common electrodes 9 made of a transparent conductive film such as ITO, etc. the protrusion portions 28 serving as the alignment control means, and a vertical alignment film (not shown) made of polyimide, etc. similarly to the lower substrate 10 are formed. In FIG. 3(a), the common electrodes 9 are formed in a stripe shape extending upwardly and downwardly in the paper surface, and are common to the respective dot areas arranged as the dot areas D1, D2, and D3 in the paper surface. The protrusion portions 28 are made of a resin material including an organic film such as acryl resin, and are protruded toward the liquid crystal layer 50 from the surface of the upper substrate 25 in a direction perpendicular to the substrate surface.

Next, a polarizing plate 19 is formed on the outer surface side of the lower substrate 10 (the opposite side of the surface facing the liquid crystal layer 50) and a polarizing plate 17 is formed on the outer surface side of the upper substrate 25. The polarizing plates 17 and 19 transmit only the linearly-polarized light having a polarizing axis of a predetermined direction and are provided with a cross-nicol arrangement. A backlight 15 as a light source for the transmissive display is provided on the outside of the polarizing plate 19 formed on the lower substrate 10.

Next, features of the liquid crystal display device 100 according to the present invention will be described.

As shown in FIG. 3(b), the black matrix BM is provided correspondingly to the positions of the protrusion portions 28 protruded toward the liquid crystal layer 50 from the upper substrate 25 and correspondingly to the slit portions 29 provided in the pixel electrodes 31. That is, as shown in FIG. 3(a), the positions of the protrusion portions 28 and the slit portions 29 are overlapped with the black matrix BM in a plan view. The black matrix BM is made of metal material having high light-reflecting property such as aluminum, silver, etc., and has a function of reflecting the light incident from the backlight 15 into the lower substrate 10 side as well as a function of shielding the light. It is preferable that the width of the black matrix BM is greater than or equal to the widths of the protrusion portion 28 and the slit portion 29.

As described above, since the liquid crystal display device 100 comprises the protrusion portions 28 and the slit portions 29 as the alignment control means, it is preferable for controlling the alignment direction of the liquid crystal molecules in the vertical alignment mode at the time of application of voltage. A negative liquid crystal is usually used when the vertical alignment mode is employed. However, since the liquid crystal molecules vertical to the substrate surface in an initial alignment state are made to fall down with application of voltage, the direction in which the liquid crystal molecules fall down cannot be controlled without any scheme and thus unevenness of alignment occurs, so that a display characteristic is deteriorated. For this reason, the control of alignment direction of the liquid crystal molecules at the time of application of voltage is important for employing the vertical alignment mode.

Accordingly, in the liquid crystal display device 100, since the protrusion portions 28 and the slit portions 29 are formed in the surface facing the liquid crystal layer, it is possible to regulate or control the direction in which the liquid crystal molecules fall down, so that the unevenness of alignment is difficult to occur, display defects such as afterimage, spotty stains, etc. are repressed, and the wide viewing angle can be realized.

In the aforementioned liquid crystal display device 100, since only the protrusion portions 28 and the slit portions 29 are provided but the black matrix BM is formed at the positions corresponding to the protrusion portions 28 and the slit portions 29, the black matrix BM represses the leakage of light and prevents the deterioration of contrast, even when the birefringence occurs around the protrusion portions 28 due to the inclination of the liquid crystal molecules. Further, by generating a fringe effect around the slit portions 29, the light-shielding film repress the leakage of light and prevents the deterioration of contrast, even when the liquid crystal molecules are slightly inclined. Therefore, a high-contrast display is possible.

Since the leakage of light can be further repressed by making the width of the black matrix BM larger than the width of the protrusion portions 28 and the slit portions 29, it is possible to further promote the enhancement of contrast.

In the liquid crystal display device 100 described above, since the black matrix BM is made of metal having a light-reflecting property, the black matrix BM has a function of reflecting light as well as a function of shielding the light. Therefore, the light incident on the black matrix BM from the backlight 15 side is reflected as it is, is restored to the backlight 15, and is reused as the exit light. Therefore, the deterioration of brightness is not caused due to formation of the light-shielding film. That is, since the light reflected from the black matrix BM is made to exit to the upper substrate 25 side, usage efficiency of light can be enhanced, so that it is possible to accomplish the enhancement of brightness.

In the present embodiment, the black matrix BM is provided correspondingly to the protrusion portions 28 and the slit portions 29, but the black matrix BM may be provided correspondingly to only the protrusion portions 28.

Specifically, around the protrusion portions 28 among the alignment control means, the slope of the liquid crystal molecules is larger than that around the slit portions 29 and the birefringence occurs greatly, so that the leakage of light is increased. Therefore, by forming the black matrix BM only at the positions corresponding to the protrusion portions 28, it is possible to obtain the advantages described above.

In the present embodiment, the color filter 22 is provided on the lower substrate 10 side, but the present embodiment is not limited to this structure. If only the black matrix BM is provided correspondingly to the protrusion portions 28 and the slit portions 29, the color filter may be formed on the upper substrate 25 side.

Second Embodiment

Next, a second embodiment of the present invention will be described with reference to the drawings. In the respective drawings, in order to recognize respective layers and respective members from the drawings, the respective layers and the respective members are illustrated with different scales. The same elements as the first embodiment will be denoted by the same reference numerals and description thereof will be omitted.

Differences between the present embodiment and the first embodiment will be described. In the first embodiment, the black matrix BM is provided on the lower substrate 10. On the contrary, in the present embodiment, the black matrix is also provided on the upper substrate 25. In the present embodiment, a resin film 26 is formed on the upper substrate 25.

Figure 4:
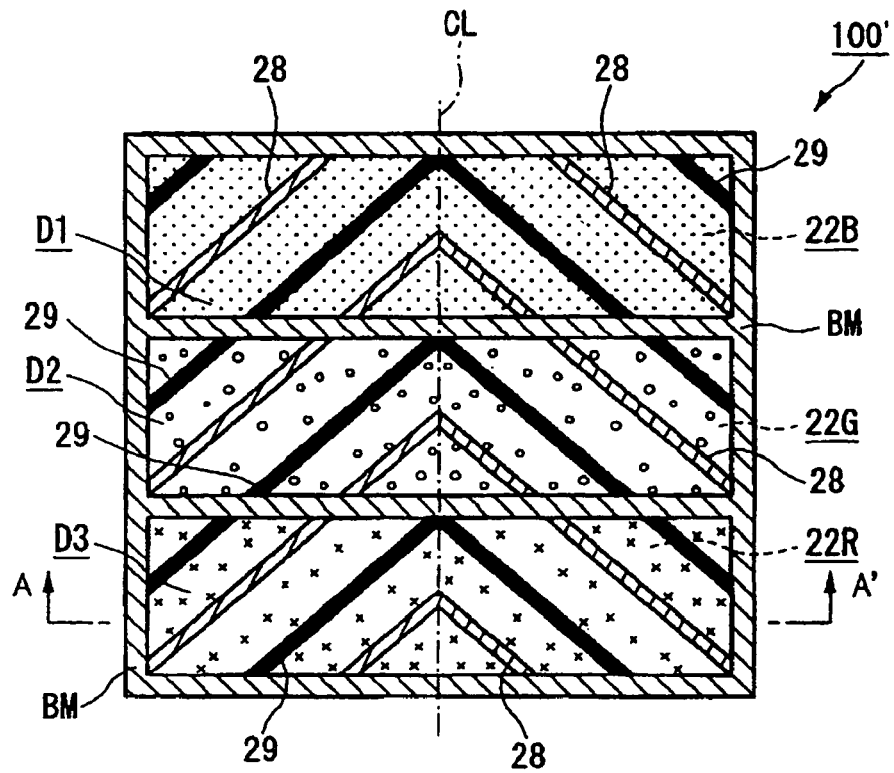
FIG. 4a shows a schematic plan view and FIG. 4b shows a schematic cross-sectional view of three dot areas (one pixel area) of a liquid crystal display device according to a second embodiment of the present invention.
Figure 4:
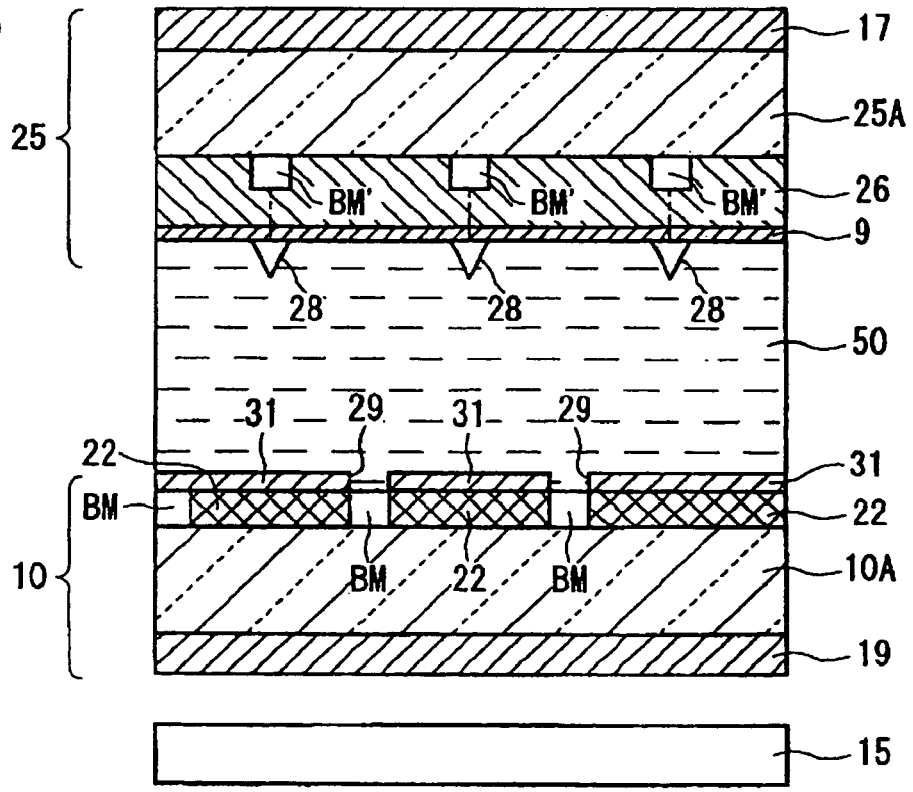

Next, a pixel structure of a liquid crystal display device 100' according to the present embodiment will be described with reference to FIG. 4. FIG. 4(a) is a schematic plan view of a pixel electrode 31, and FIG. 4(b) is a schematic cross-sectional view taken along a line A-A' of FIG. 4(a) and illustrates a main part.

Since FIG. 4(a) is equal to FIG. 3(a), description thereof is omitted.

As shown in FIG. 4(b), the color filter 22, the black matrix BM, the pixel electrode 31, the slit portions 29 and the polarizing plate 19 are provided on the lower substrate 10, and the black matrix BM is formed correspondingly to only the slit portions 29, which is a different structure from the first embodiment.

The common electrodes 9, the protrusion portions 28, and the polarizing plate 17 are provided on the upper substrate 25, and the black matrix BM' is formed on the substrate body 25A correspondingly to only the protrusion portions 28, which is a structure different from the first embodiment. In addition, the resin film 26 is formed to cover the black matrix BM'. The resin film 26 is made of an organic film such as acryl resin, etc. and is provided between the common electrodes 9 and the substrate body 25A.

Here, the black matrix BM' and the protrusion portions 28 are provided in a state where they are positioned with high accuracy, and are formed using a known patterning method such as a photolithography technique, etc.

The black matrix BM' is made of resin material, etc. not having a light-reflecting property. By forming the black matrix in this way, the reflection of external light incident from the substrate 25 side can be prevented, so that it is possible to obtain a display having more excellent display quality.

As described above, in the liquid crystal display device 100', since the protrusion portions 28 and the slit portions 29 are formed in the surface facing the liquid crystal layer similarly to the first embodiment described above, it is possible to regulate or control the direction in which the liquid crystal molecules fall down after the liquid crystal molecules exhibit the vertical alignment as the initial state, so that the unevenness of alignment is difficult to occur, the display defects such as afterimage, spotty stains, etc. are repressed, and the wide viewing angle can be realized. Since the black matrixes BM and BM' are provided at the positions corresponding to the protrusion portions 28 and the slit portions 29, the leakage of light can be repressed due to the inclination of liquid crystal molecules or the fringe effect, thereby accomplishing a high-contrast display.

In the present embodiment, since the black matrix BM' and the protrusion portions 28 are formed on the same substrate (upper substrate 25), it is not necessary to perform with high accuracy the process of bonding the upper substrate 25 and the lower substrate 10 through the seal member.

Specifically speaking, the black matrix BM' and the protrusion portions 28 are formed on the upper substrate 25 with high accuracy to match both positions each other using the photolithography technique, etc. On the contrary, when the black matrix BM and the protrusion portions 28 are formed on a pair of the upper and lower substrates 10 and 25, it is necessary to bond the pair of substrates 10 and 25 after forming the seal member on one substrate. Here, since it is necessary to position the black matrix BM and the protrusion portions 28 with high accuracy, it is difficult to position both.

Therefore, by forming the black matrix BM and the protrusion portions 28 on the same substrate, an error due to bonding the upper and lower substrates 10 and 25 can be neglected, so that it is possible to match the positions of the black matrix BM' and the protrusion portions 28 each other with high accuracy.

Third Embodiment

Next, a third embodiment of the present invention will be described with reference to the drawings. In the respective drawings, in order to recognize respective layers and respective members from the drawings, the respective layers and the respective members are illustrated with different scales.

Figure 5:
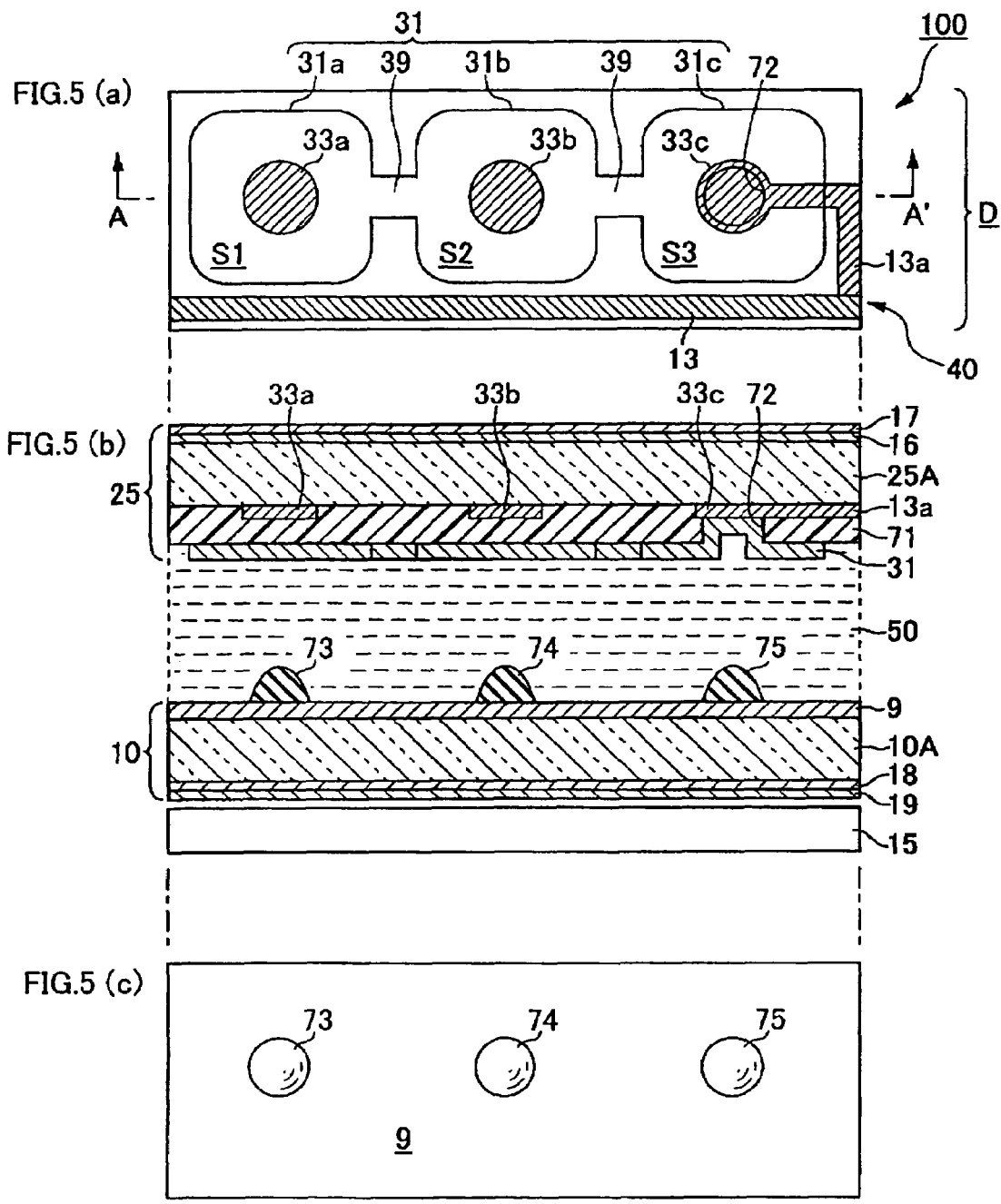
FIG. 5a shows a schematic plan view.
FIG. 5b shows a schematic cross-sectional view.
FIG. 5c shows a second schematic plan view of one dot area of a liquid crystal display device according to a third embodiment of the present invention.

Now, a pixel structure of a liquid crystal display device 100 according to the third embodiment will be described with reference to FIG. 5. FIG. 5 is a diagram illustrating one dot area of the liquid crystal display device 100. The liquid crystal display device 100 according to the present embodiment comprises a pair of substrates opposite to each other with a liquid crystal layer therebetween. FIG. 5(a) is a plan view of one substrate (upper substrate 25) constituting the dot area, FIG. 5(b) is a cross-sectional view taken along a line A-A' of FIG. 5(a), and FIG. 5(c) is a plan view of the other substrate (lower substrate 10).

A color filter is not shown in the dot area D shown in FIG. 5. However, when the color filter is provided, one colored portion of one color of three primary colors R, G, and B may be provided correspondingly to one dot area D and one pixel area which can mix and output a red light component, a green light component and a blue light component through three dot areas D corresponding to one group of colored portions (RGB) may be formed.

As shown in FIG. 5(b), the liquid crystal display device 100 according to the present embodiment has a structure that a liquid crystal layer 50 made of liquid crystal material, indicating that the initial alignment state is vertical alignment and having a negative dielectric anisotropy, is interposed between the lower substrate 10 and the upper substrate 25 (element substrate) disposed to be opposite to the lower substrate.

As shown in FIG. 5(a), the upper substrate 25 comprises a scanning line 13, a pixel electrode 31 disposed along a direction (left-right direction in the figure) in which the scanning line 13 extends, a wiring portion 13a connecting the scanning line 13 to the pixel electrode 31 and having a hook shape in a plan view, and a plurality of light-shielding portions 33a to 33c having substantially a circular shape and disposed in an area formed with the pixel electrode 31 at a predetermined interval.

Although not shown, a TFD element 40 is provided at an intersection of the wiring portion 13a and the scanning line 13 shown in FIG. 5(a). That is, in the present embodiment, the scanning line 13 may be made of, for example, tantalum and an insulating film made of tantalum oxide may be formed on the surface thereof. The hook-shaped wiring portion 13a may be made of, for example, chromium and when the wiring portion is disposed to intersect the scanning line 13 through the insulating film, the TFD element 40 may be formed at the intersection.

Referring to the cross-sectional structure shown in FIG. 5(b), the wiring portion 13a and the light-shielding portions 33a to 33c are formed on the substrate body 10A made of transparent material such as glass, quartz, etc., and an interlayer insulating film 71 made of, for example, silicon oxide, resin material, etc. is formed to cover the wiring portion and the light-shielding portions. The pixel electrode 31 made of, for example, ITO (Indium Tin Oxide) is formed on the interlayer insulating film 71, and the light-shielding portion 33c (that is, TFD element 40) and the pixel electrode 31 are electrically connected each other through a contact hole reaching the light-shielding portion 33c through the interlayer insulating film 71. Although not shown, a vertical alignment film made of polyimide, etc. is provided on the pixel electrode 31, and has a function of maintaining the initial alignment state of the liquid crystal layer 50 in the vertical alignment. The alignment film has not been subjected to the alignment process such as a rubbing process, etc.

As shown in FIG. 5(a), the pixel electrode 31 comprises three island-shaped portions 31a, 31b, and 31c disposed along the scanning line 13 and connection portions 39 connecting the island-shaped portions adjacent. In the present embodiment, by providing a plurality of island-shaped portions in one dot area D, liquid crystal domains having the same shape are formed in the areas corresponding to the island-shaped portions 31a, 31b, and 31c. That is, three dot sub-areas S1, S2, and S3 are provided in one dot area.

In general, in the liquid crystal display device having a three-color filter, an aspect ratio of one dot area is about 3:1. Therefore, as in the present embodiment, when three dot sub-areas S1, S2, and S3 are provided in one dot area D, the shape of one dot sub-area can be made in one of substantially a circular shape or substantially a regular polygonal shape, thereby improving the symmetry of the viewing angle. The shape of the dot sub-areas S1, S2, and S3 (island-shaped portions 31a, 31b, and 31c) is approximately quadrate of which corner portions are rounded in FIG. 5, but is not limited to this shape and may be, for example, circular, elliptical, and polygonal else. In other words, the island-shaped portions 31a to 31c can be considered as being formed at the circumferential edges of the dot area D as a result forming electrode slits by cutting out the pixel electrode.

The wiring portion 13a extending in a hook shape to the pixel electrode 31 side from the scanning line 13 extends to a center of the island-shaped portion 31c and the diameter thereof is expanded into a circular shape at the center, thereby the light shielding portion 33c. The wiring portion is electrically connected to the pixel electrode 31 through the contact hole 72 formed through the interlayer insulating film 71.

The other light-shielding portions 33a and 33b shown in FIG. 5(a) are disposed at the center of the dot sub-area S1 (island-shaped portion 31a) and the center of the dot sub-area S2 (island-shaped portion 31b). The light-shielding portions 33a and 33b are formed in the same layer and out of the same material as the wiring portion 13a.

On the other hand, the lower substrate 10 comprises the substrate body 10A made of transparent material such as quartz, glass, etc. as a major body. The counter electrode 9 made of transparent conductive material such as ITO, etc. is formed on the inner surface side (liquid crystal layer 50 side) of the substrate body 10A and dielectric protrusions (alignment control means) 73, 74, and 75 made of insulating resin material are protruded from the counter electrode 9. Although not shown, a resin alignment film mad of polyimide, etc. is formed to cover the counter electrode 9 and the dielectric protrusions 73 to 75. The counter electrode 9 shown in FIG. 5(c) is substantially formed in a stripe shape extending upward and downward from the paper surface, and serves as a common electrode in a plurality of dot areas arranged upward and downward in FIG. 5(a).

The dielectric protrusions 73 to 75 serves as the alignment control means for controlling the alignment direction at the time of application of voltage to the liquid crystal molecules constituting the liquid crystal layer 50 of the vertical alignment mode, are disposed on the counter electrode 9 at a predetermined interval, and are disposed at the positions two-dimensionally overlapped with the light-shielding portions 33a to 33c formed on the upper substrate 25 when the panel is seen in a plan view.

On the outer surface side of the lower substrate 10, a retardation plate 18 and a polarizing plate 19 are disposed sequentially from the substrate body 10A side and on the outer surface side of the upper substrate 25, a retardation plate 16 and a polarizing plate 17 are disposed sequentially from the substrate body 25A. On the outside of the lower substrate 10, a backlight (illumination means) 15 serving as a light source for transmissive display is provided.

In the liquid crystal display device 100 according to the present embodiment, since the dielectric protrusions 73 to 75 as the alignment control means are provided in the inner surface of the lower substrate 10 corresponding to the centers of the respective dot sub-areas S1, S2, and S3, the liquid crystal molecules are obliquely aligned on the surfaces of the dielectric protrusions 73 to 75 (are aligned vertically to the surfaces of the dielectric protrusions). Therefore, in the respective dot sub-areas S1 to S3, the liquid crystal molecules are aligned in a radial shape about the dielectric protrusions at the time of application of voltage. At the upper substrate 25 side, the liquid crystal molecules are aligned in a direction perpendicular to the side edges of the island-shaped portions 33a to 33c due to distortion of the electric field at the side edges. It is possible to align the liquid crystal molecules in a radial shape from the centers of the respective dot sub-areas S1 to S3 with the alignment control powers, so that a high-contrast display can be obtained in all directions.

In the vicinity of the dielectric protrusions 73 to 75, the distortion of the electric field due to a difference in dielectric constant between the liquid crystal and the dielectric protrusions is generated at the time of application of voltage, and the liquid crystal molecules are also aligned in a radial shape about the dielectric protrusions with the alignment control power due to the distortion of the electric field.

In the present embodiment, since the light-shielding portions 33a to 33c are provided at the positions two-dimensionally overlapped with the dielectric protrusions 73 to 75, the leakage of light from the centers of the island-shaped portions 33a to 33c can be prevented, thereby further accomplishing the enhancement of contrast. That is, on the surface of the dielectric protrusions 73 to 75, since the liquid crystal molecules are aligned in a direction oblique about the substrate surface, the leakage of light can be generated due to variation of the polarized state of the transmitted light different from other areas. However, the leaked light can be intercepted by the light-shielding portions 33a to 33c.

Specifically, in the present embodiment, since the light-shielding portions 33a to 33c can be formed in the same step as the wiring portion 13a extending from the TFD element 40, it is possible to improve the display contrast without increase in complexity of the manufacturing process and increase of the number of processes. Since the increase in height of the dielectric protrusions 73 to 75 has no influence on the contrast, the response characteristic of the liquid crystal may be improved by increasing the height of the dielectric protrusions.

As described above, the light-shielding portions 33a to 33c are made of chromium similarly to the wiring portion 13a. Accordingly, even when external light is incident on the light-shielding portions 33a to 33c from the substrate body 25A side, the visibility of the liquid crystal display device cannot be deteriorated because the chromium film is a metal film having a low light-reflecting property.

Modification of Third Embodiment

In the above embodiment, it has been described that the liquid crystal display device 100 is constructed as a transmissive liquid crystal display device. However, the liquid crystal display device according to the present invention may be constructed as a transflective or reflective liquid crystal display device shown in FIG. 6 or 7.

[Transflective Liquid Crystal Display Device]

First, an example where the present invention is applied to a transflective liquid crystal display device will be described with reference to FIG. 6. Among the constituent elements shown in FIG. 6, the same constituent elements as the liquid crystal display device 100 shown in FIGS. 1 to 6 will be denoted by the same reference numerals and description thereof will be omitted. FIGS. 6(a) to 6(c) correspond to FIGS. 5(c) to 5(c) of the above embodiment.

Figure 6:
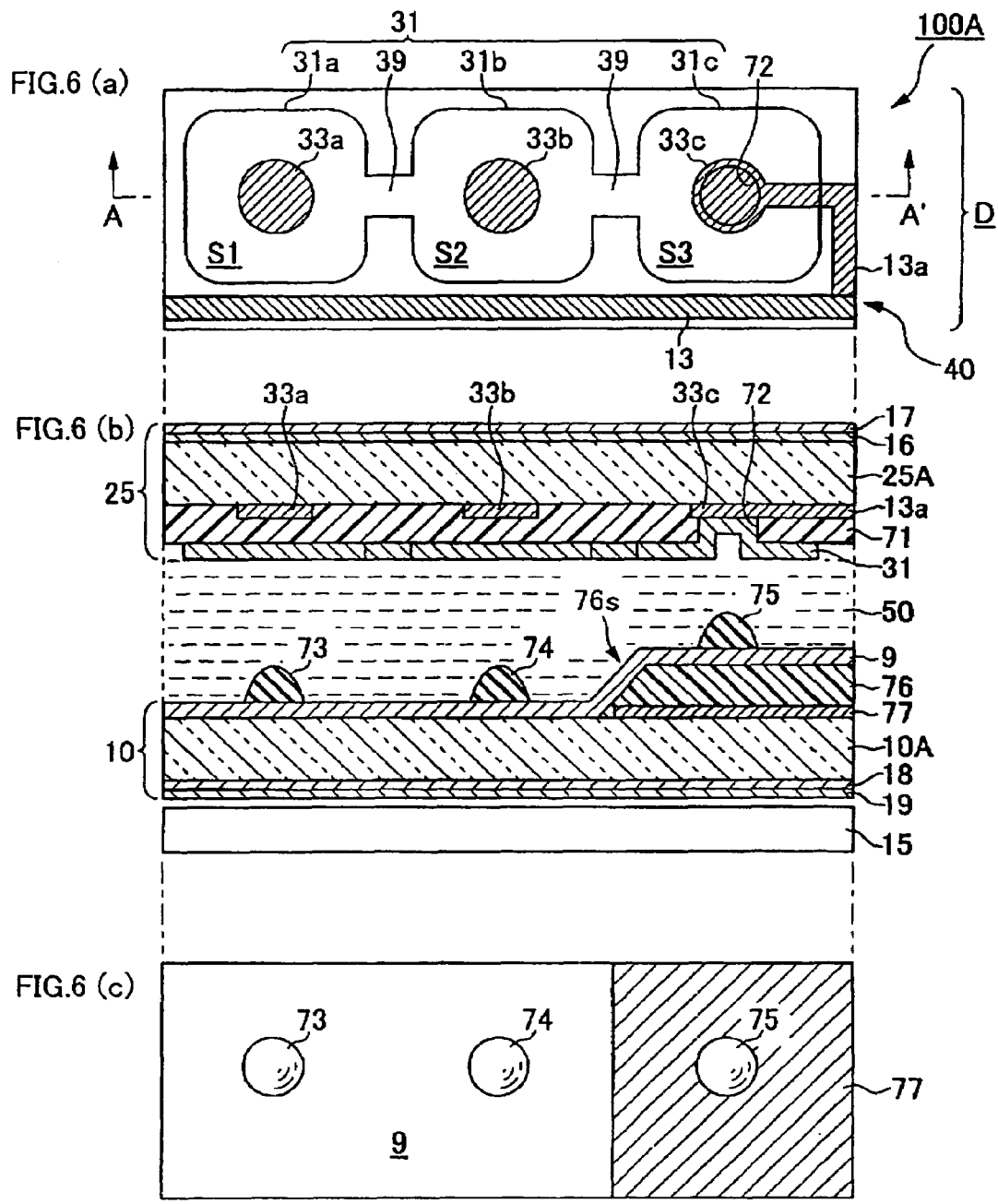
FIG. 6a shows a schematic plan view.
FIG. 6b shows a schematic cross-sectional view.
FIG. 6c shows a second schematic plan view of one dot area of a transflective liquid crystal display device according to a modification of the third embodiment of the present invention.

The liquid crystal display device 100A shown in FIG. 6 comprises an upper substrate 25 and a lower substrate 10 disposed to be opposite each other with a liquid crystal layer 50 therebetween, and has a structure where a backlight 15 is provided at the outer surface side of the lower substrate 10. The structure of the upper substrate 25 is similar to that of the liquid crystal display device 100 described above and some structure of the lower substrate 10 is different. That is, a reflecting layer 77 made of a metal film having a light-reflecting property, such as aluminum, silver, etc., and a liquid-crystal-layer thickness adjusting layer 76 made of resin material such as acryl resin, etc. are formed on the inner surface side of the substrate body 10A, and a counter electrode 9 is formed on the liquid-crystal-layer thickness adjusting layer 76.

The reflecting layer 77 and the liquid-crystal-layer thickness adjusting layer 76 are partially formed in a dot area D. More specifically, the reflecting layer 77 and the liquid-crystal-layer thickness adjusting layer 76 are formed in an area corresponding to an island-shaped portion 33c (dot sub-area S3) of the pixel electrode 31 of the upper substrate 25 side, and the thickness (cell gap) of the liquid crystal layer 50 of the area where the reflecting layer 77 is formed is smaller than the thickness of the liquid crystal layer of the other areas (dot sub-areas S1 and S2) by the thickness of the liquid-crystal-layer thickness adjusting layer 76. That is, the liquid crystal display device 100A according to the present embodiment is a transflective liquid crystal display device of a multi gap type, where the dot sub-area S3 included in the area in which the reflecting layer 77 is formed severs as a reflective display area and the other dot sub-areas S1 and S2 serve as a transmissive display area. The thickness of the liquid crystal layer 50 to be adjusted by the thickness of the liquid-crystal-layer thickness adjusting layer 76 is about 1.5 μm in the reflective display area and is about 3 μm in the transmissive display area.

The dielectric protrusions 73 to 75 serving as the alignment control means of the vertically-aligned liquid crystal are provided on the counter electrode 9 and the dielectric protrusions are provided at the positions opposite to the centers of the island-shaped portions 31a to 31c of the pixel electrode 31 similarly to the liquid crystal display device shown in FIG. 5. Therefore, in the liquid crystal display device 100A, since the light-shielding portions 33a to 33c are disposed at the positions two-dimensionally overlapped with the dielectric protrusions 73 to 75, the leaked light due to the dielectric protrusions 73 to 75 can be prevented from being emitted to an observer side (outside of the upper substrate 25), so that it is possible to obtain transmissive display and reflective display with high contrast.

The boundary regions between the transmissive display area and the reflective display area forming a step difference due to the liquid-crystal-layer thickness adjusting layer 76 forms an inclined surface portion 76s as shown in FIG. 6(b). However, in the liquid crystal display device according to the present embodiment, the inclined surface portion 76s is disposed to be two-dimensionally overlapped with a connection portion 39 connecting the island-shaped portion 31b and the island-shaped portion 31c. By employing such a structure, the unevenness of alignment of the liquid crystal molecules due to the inclined surface portion 76s can be prevented from having an influence on the dot sub-areas S2 and S3 constituting main display areas, so that it is possible to obtain a high-contrast display.

In the above structure, the reflecting layer 77 may be formed above (liquid crystal layer side) of the liquid-crystal-layer thickness adjusting layer 76, and in this case, since the display light during the reflective display does not pass through the liquid-crystal-layer thickness adjusting layer, there is an advantage that attenuation or coloring of the display light can be reduced. Furthermore, in this structure, the reflecting layer 77 may be used as a part of the counter electrode 9.

In the reflecting layer 77 or the liquid crystal layer side thereof, it is preferable that means for scattering the light reflected from the reflecting layer 77 is provided. Specifically, the scattering function can be given by forming a fine uneven shape or providing an optical element having a light-scattering function on the surface of the reflecting layer 77. By providing the light-scattering means, the regular reflection of the external light during the reflective display can be prevented, thereby obtaining excellent visibility.

The liquid-crystal-layer thickness adjusting layer 76 may be provided on the upper substrate 25 side. In the present embodiment, the liquid-crystal-layer thickness adjusting layer 76 and the reflecting layer 77 are provided in the dot sub-area S3 having the conductive connection portion between the pixel electrode 31 and the TFD element 40. However, the liquid-crystal-layer thickness adjusting layer 76 and the reflecting layer 77 may be provided in the dot sub-area S1 or S2 where the conductive connection portion is not formed.

In the present embodiment, although the transflective liquid crystal display device of a multi gap type has been exemplified, the present invention can be applied to a transflective liquid crystal display device having a structure where the liquid-crystal-layer thickness adjusting layer 76 is not provided without problem, and it is possible to enhance the contrast by preventing the leaked light, of course.

[Reflective Liquid Crystal Display Device]

Next, an example where the present invention is applied to a reflective liquid crystal display device will be described with reference to FIG. 7. Among the constituent elements shown in FIG. 7, the same constituent elements as the liquid crystal display device 100 shown in one of FIGS. 1 to 5 are denoted by the same reference numerals and description thereof will be omitted. FIGS. 7(a) to 7(c) are diagrams corresponding to FIGS. 5(a) to 5(c) in the above embodiments, respectively.

Figure 7:
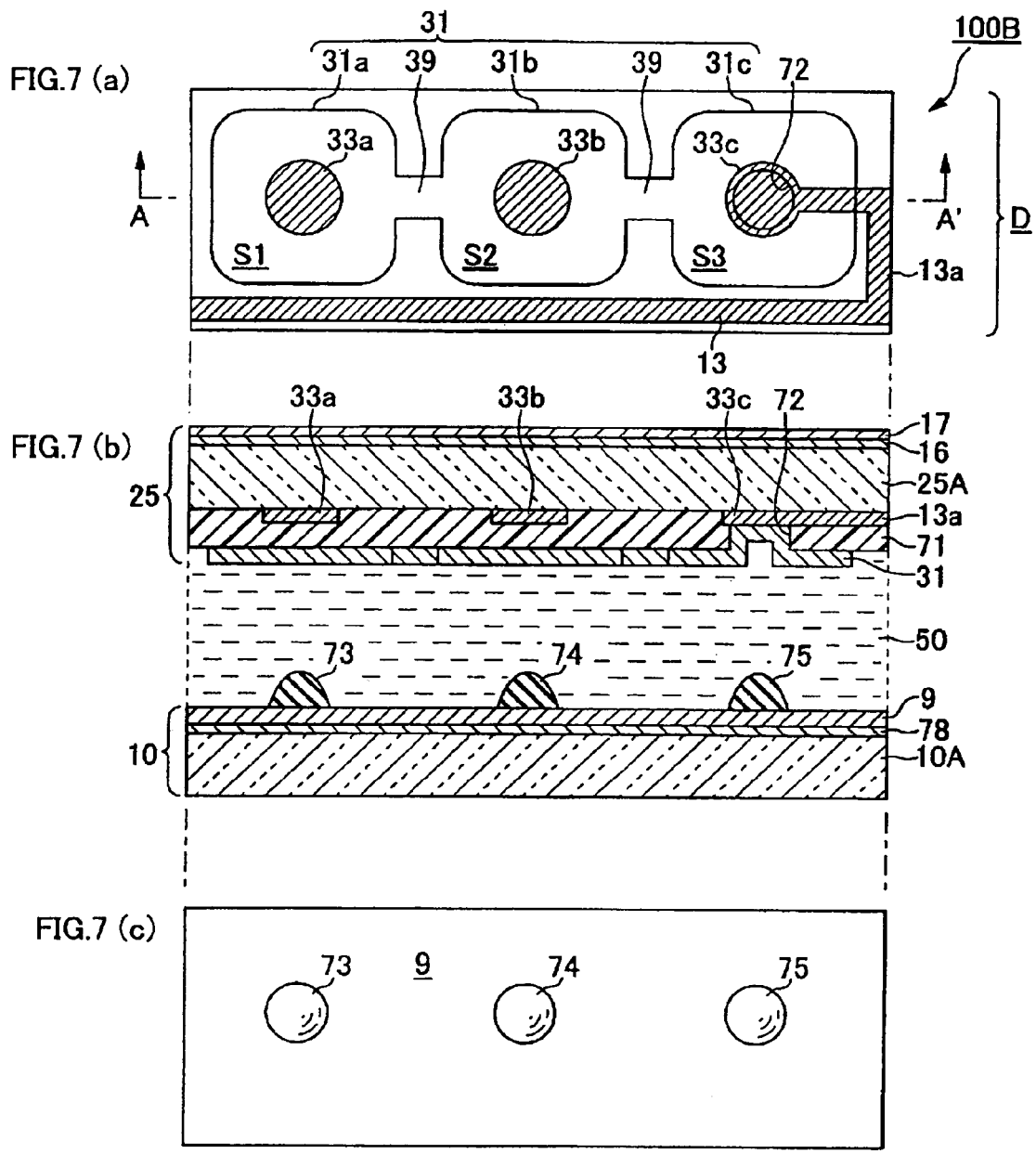
FIG. 7a shows a schematic plan view.
FIG. 7b shows a schematic cross-sectional view.
FIG. 7c shows a second schematic plan view of one dot area of a reflective liquid crystal display device according to a modification of the third embodiment of the present invention.

A liquid crystal display device 100B according to the present embodiment shown in FIG. 7 comprises an upper substrate 25 and a lower substrate 10 disposed to be opposite each other with a liquid crystal layer 50 therebetween. The structure of the upper substrate 25 is similar to that of the aforementioned liquid crystal display device 100 but the structure of the lower substrate 10 is partially different. That is, on the inner surface side of a substrate body 10A, a reflecting layer 78 made of a metal film having a light-reflecting property, such as aluminum, silver, etc., and a counter electrode 9 is formed on the reflecting layer 78. A retardation plate and a polarizing plate are not formed on the outer surface side of the substrate body 10A, and a backlight is not formed on the rear surface of the panel.

In the liquid crystal display device 100B having the above structure, since dielectric protrusions 73 to 75 of the lower substrate 10 and light-shielding portions 33a to 33c of the upper substrate 25 are two-dimensionally overlapped with each other, the deterioration of contrast resulting from the leakage of light due to the oblique alignment of the liquid crystal molecules around the dielectric protrusions 73 to 75 can be prevented, so that it is possible to obtain reflective display with a wide viewing angle and high contrast.

Fourth Embodiment

Next, a fourth embodiment of the present invention will be described with reference to FIG. 8. The liquid crystal display device according to the present embodiment is a transmissive liquid crystal display device of a vertical alignment mode similarly to the liquid crystal display device 100 shown in FIGS. 1 to 5. Among the constituent elements shown in FIG. 8, the same constituent elements as the liquid crystal display device 100 shown in FIGS. 1 to 5 are denoted by the same reference numerals and description thereof will be omitted. FIGS. 8(a) to 8(c) are diagrams corresponding to FIGS. 5(a) to 5(c) of the above embodiment, respectively.

Figure 8:
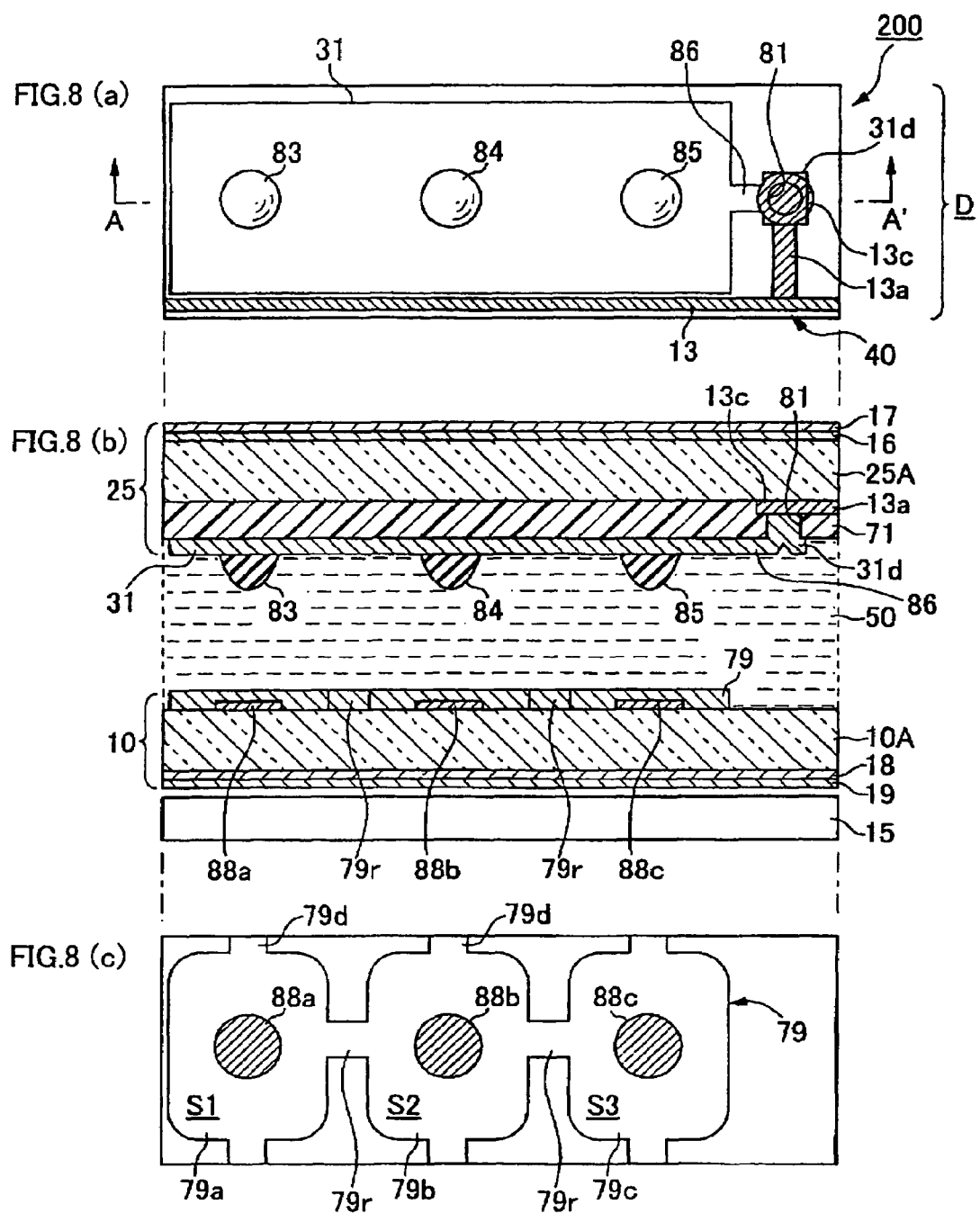
FIG. 8a shows a schematic plan view.
FIG. 8b shows a schematic cross-sectional view.
FIG. 8c shows a second schematic plan view of one dot area of a liquid crystal display device according to a fourth embodiment of the present invention.

The liquid crystal display device 200 shown in FIG. 8 comprises an upper substrate 25 and a lower substrate 10 disposed to be opposite each other with a liquid crystal layer 50 therebetween as major elements. As shown in FIGS. 8(a) and 8(b), the upper substrate 25 comprises, in the inner surface side of a transparent substrate body 25A, a scanning line 13 extending in the left-right direction of the figure, a pixel electrode 31 disposed longitudinally along the scanning line 13 and having substantially a rectangular shape in a plan view, a wiring portion 13a extending from the scanning line 13 to the pixel electrode 31, and dielectric protrusions 83 to 85 disposed on the pixel electrode 31 at a predetermined interval. The dielectric protrusions 83 to 85 serve as the alignment control means for controlling the alignment state of the liquid crystal molecules of the vertical alignment mode at the time of application of voltage, similarly to the dielectric protrusions 73 to 75 according to the above embodiment.

Although not shown, a TFD element 40 is formed at the intersection of the scanning line 13 and the wiring portion 13a. A diameter-enlarged portion is provided at a front end of the wiring portion 13a extending upward in the figure from the TFD element 40 side and forms a contact portion 13c electrically connected to the pixel electrode 31 to be described later. As shown in FIG. 8(b), an interlayer insulating film 71 is formed to cover the scanning line 13 and the wiring portion 13a, and the pixel electrode 31 is formed on the interlayer insulating film 71. A connection portion 86 extends to the right side of the figure from one side end (right side end) of the pixel electrode 31, a width-enlarged portion 31d is provided at the front end thereof, and the wiring portion 13a (TFD element 40) and the pixel electrode 31 are electrically connected each other by allowing the width-enlarged portion 31d and the contact portion 13c to be electrically connected through a contact hole 81 passing through the interlayer insulating film 71 and reaching the contact portion 13c of the wiring portion 13a.

On the other hand, as shown in FIGS. 8(b) and 8(c), the lower substrate 10 comprises, in the inner surface side of a transparent substrate body 10A, light-shielding portions 88a to 88c disposed at a predetermined interval and having a circular shape in a plan view, and a counter electrode 79. The light-shielding portions 88a to 88c can be formed by patterning a metal film or resin film having a light-shielding property.

The counter electrode 79 is made of transparent conductive material such as ITO, etc. and has three island-shaped portions 79a, 79b, and 79c having substantially a rectangular shape in a plan view in a dot area D shown in the figure. The island-shaped portions 79a to 79c are electrically connected each other through connection portions 79r extending in the left-right direction of the figure. Connection portions 79d, ... extending in the up-down direction of the figure from the respective island-shaped portions 79a to 79c are connected to the island-shaped portions provided in a dot area adjacent to the dot area shown. Therefore, the counter electrode 79 is formed substantially in a stripe shape as seen from the plane extending in a direction perpendicular to the scanning line 13 of the upper substrate 25 as a whole.

Since the counter electrode 79 has a structure that it is divided into a plurality of island-shaped portions 79a to 79c in the dot area D and the dielectric protrusions 83 to 85 of the upper substrate 25 are disposed to be opposite to the centers of the island-shaped portions 79a to 79c, the liquid crystal display device 200 can align the liquid crystal molecules in a radial shape from the centers of the respective island-shaped portions 79a to 79c at the time of application of voltage. That is, in the liquid crystal display device 200, three dot sub-areas S1, S2, and S3 forming the liquid crystal domain of a radial shape correspondingly to the plane area of the respective island-shaped portions 79a to 79c constitute one dot area D.

In the outer surface side of the upper substrate 25, a retardation plate 16 and a polarizing plate 17 are stacked sequentially from the substrate body 25A side, and in the outer surface side of the lower substrate 10, a retardation plate 18 and a polarizing plate 19 are stacked in that order. A backlight 15 as illumination means is provided outside of the lower substrate 10. Although not shown, a vertical alignment film is formed to cover the pixel electrode 31 and the dielectric protrusions 83 to 85 of the upper substrate 25 and a vertical alignment film is also formed on the counter electrode 79 of the lower substrate 10.

In the liquid crystal display device 200 having the above structure, as shown in FIG. 8(c), the light-shielding portions 88a to 88c are disposed at the centers of the respective island-shaped portions 79a to 79c, respectively. As shown in FIG. 8(b), the light-shielding portions 88a to 88c are provided at the positions two-dimensionally overlapped with the dielectric protrusions 83 to 85 formed on the pixel electrode 31 of the uppers substrate 25. As a result, in the liquid crystal display device 200 according to the present embodiment, since the leaked light due to the oblique alignment of the liquid crystal molecules on the surfaces of the dielectric protrusions 83 to 85 protruded toward the liquid crystal layer 50 side can be intercepted effectively with the light-shielding portions 88a to 88c, it is possible to obtain a display with high contrast and a wide viewing angle.

Although not shown in FIG. 8, the liquid crystal display device 200 may comprise a color filter. In general, the color filter is formed at the lower substrate 10, not at the element substrate (upper substrate 25) which is formed through complex processes. In this case, for example, on the substrate body 10A, colored portions having a two-dimensional size corresponding to the pixel electrode 31 are arranged and the respective colored portions are partitioned with a light-shielding member (black matrix). The black matrix may be made of a black resin film, a resin film formed by stacking the plurality of colored portions, or a metal film.

When the liquid crystal display device 200 comprises the color filter, by forming the light-shielding member on the substrate body 10A, that is, the black matrix and the light-shielding portions 88a to 88c in the same step, it is possible to realize the enhancement of contrast of a display without increase in complexity of the processes or increase of the number of processes.

Fifth Embodiment

Next, a fifth embodiment of the present invention will be described with reference to FIG. 9. The liquid crystal display device according to the present embodiment is a transmissive liquid crystal display device of a vertical alignment mode having the same basic structure as the liquid crystal display device 200 shown in FIG. 8. Therefore, among the constituent elements shown in FIG. 9, the same constituent elements as the liquid crystal display device 200 shown in FIG. 8 will be denoted by the same reference numerals and description thereof will be omitted. FIGS. 9(a) to 9(c) are diagrams corresponding to FIGS. 8(a) to 8(c) of the above embodiment, respectively.

Figure 9:
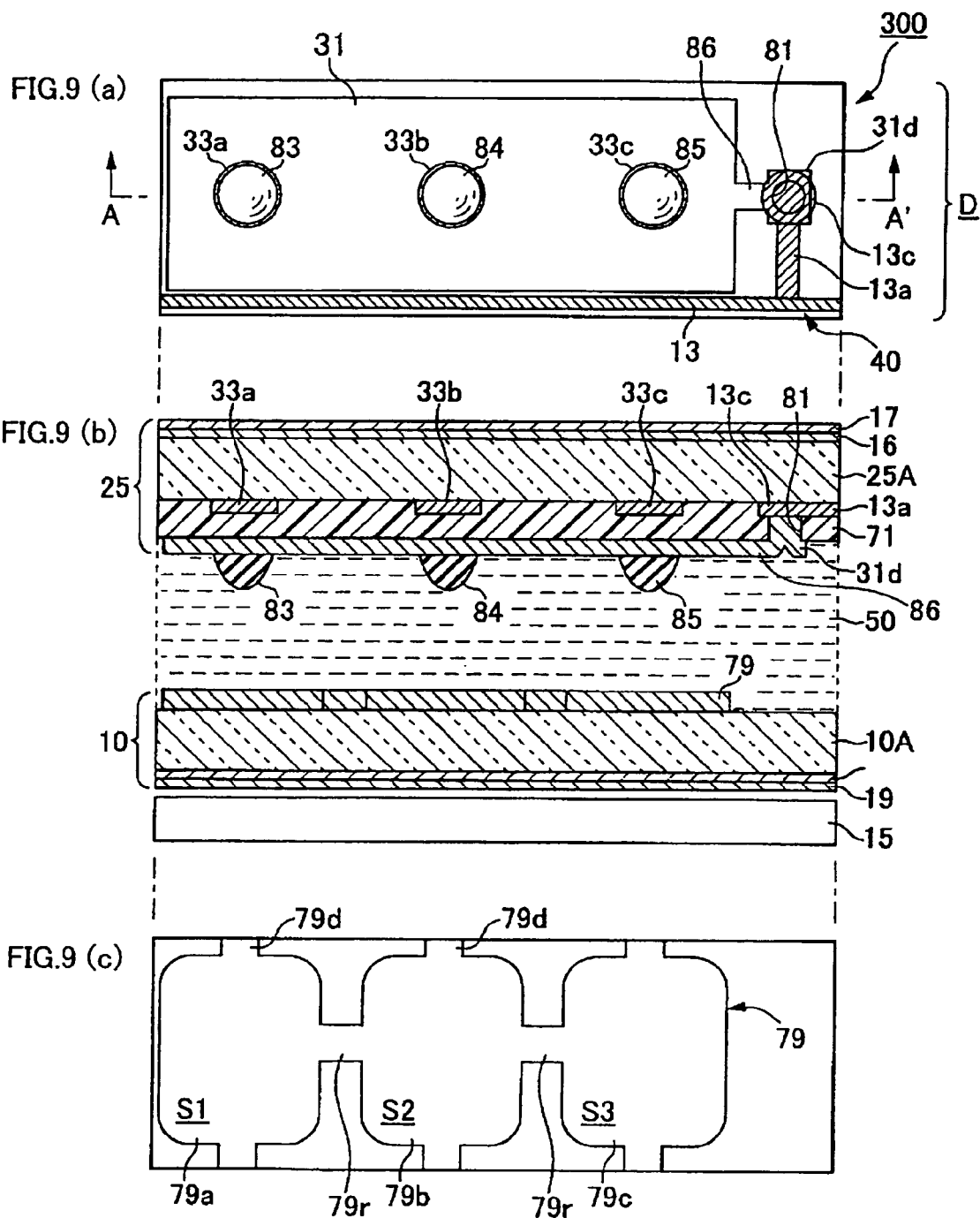
FIG. 9a shows a schematic plan view.
FIG. 9b shows a schematic cross-sectional view.
FIG. 9c shows a second schematic plan view of one dot area of a liquid crystal display device according to a fifth embodiment of the present invention.

The liquid crystal display device 300 shown in FIG. 9 is different from the liquid crystal display device 200 shown in FIG. 8, in that light-shielding portions 33a to 33c are provided in an upper substrate 25 side. That is, as shown in FIG. 9(a), the upper substrate 25 comprises a scanning line 13 extending in the left-right direction of the figure, a pixel electrode 31 disposed longitudinally along the scanning line and having substantially a rectangular shape in a plan view, and a wiring portion 13a extending from the scanning line 13 to the pixel electrode 31. The light-shielding portions 33a to 33c are formed in the area where the pixel electrode 31 is formed at a predetermined interval, and dielectric protrusions 83 to 85 are provided at the positions two-dimensionally overlapped with the light-shielding portions 33a to 33c. The dielectric protrusions 83 to 85 serve as the alignment control means for controlling the alignment state of the liquid crystal molecules of a vertical alignment mode at the time of application of voltage.

Referring to the cross-sectional structure shown in FIG. 9(b), the wiring portions 13a and the light-shielding portions 33a to 33c are formed on a transparent substrate body 25A and the pixel electrode 31 is formed thereon with an interlayer insulating film 71 covering them therebetween. The dielectric protrusions 83 to 85 are formed on the pixel electrode 31.

Since the electrical connection structure between the pixel electrode 31 and the wiring portion 13a (TFD element 40) is similar to that of the liquid crystal display device 200 shown in FIG. 8, description thereof will be omitted here.

In the liquid crystal display device 300 according to the present embodiment, since the dielectric protrusions 83 to 85 as the alignment control means of the vertically-aligned liquid crystal molecules and the light-shielding portions 88a to 88c for shielding the leaked light due to the oblique alignment of the liquid crystal molecules on the surface of the dielectric protrusions 83 to 85 are all provided on the upper substrate 25, the dielectric protrusions 83 to 85 and the light-shielding portions 88a to 88c can be positioned each other with high accuracy, so that it is possible to more effectively intercept the leaked light. Since high accuracy for positioning can be obtained, it is possible to reduce the two-dimensional size of the light-shielding portions 88a to 88c which are formed slightly greater than the dielectric protrusions 83 to 85 in consideration of the positioning error, thereby enhancing the aperture ratio of the pixels and accomplishing the enhancement of display brightness. Since the light-shielding portions 88a to 88c can be formed in the same step as the wiring portion 13a or the scanning portion 13, it is possible to enhance the display contrast without increase in complexity of the manufacturing processes or increase of the number of processes.

Therefore, the liquid crystal display device 300 according to the present embodiment can be manufactured without increase of the process load, and it is also possible to provide a liquid crystal display device capable of performing a high-contrast display with high brightness and a wide viewing angle.

Sixth Embodiment

Next, a sixth embodiment of the present invention will be described with reference to FIG. 10. The liquid crystal display device according to the present embodiment is a transmissive liquid crystal display device of a vertical alignment mode similarly to the liquid crystal display device 100 shown in FIGS. 1 to 5. Among the constituent elements shown in FIG. 10, the same constituent elements as the liquid crystal display device 100 shown in FIGS. 1 to 5 will be denoted by the same reference numerals and description thereof will be omitted. FIGS. 10(a) to 10(c) are diagrams corresponding to FIGS. 5(a) to 5(c) of the above embodiment, respectively.

Figure 10:
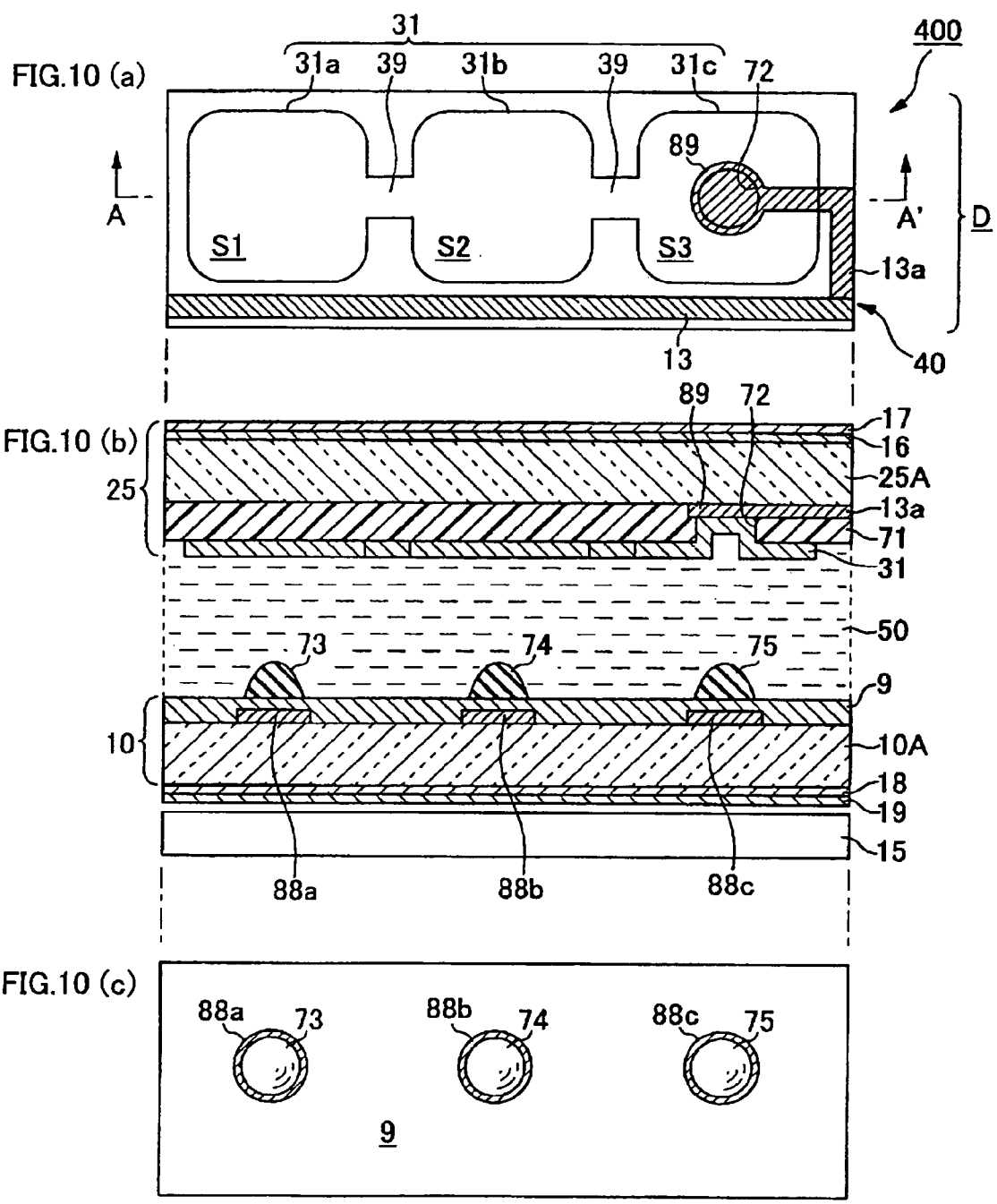
FIG. 10a shows a schematic plan view.
FIG. 10b shows a schematic cross-sectional view.
FIG. 10c shows a second schematic plan view of one dot area of a liquid crystal display device according to a sixth embodiment of the present invention.

The liquid crystal display device 400 shown in FIG. 10 comprises an upper substrate 25 and a lower substrate 10 disposed to be opposite each other with a liquid crystal layer 50 therebetween as major elements. As shown in FIG. 10, the upper substrate 25 comprises a scanning line 13 extending in the left-right direction of the figure, a pixel electrode 31 disposed longitudinally along the scanning line 13, and a wiring portion 13a extending in a hook shape from the scanning line 13 to the pixel electrode 31.

The pixel electrode 31 comprises three island-shaped portions 31a to 31c having substantially a rectangular shape in a plan view and connection portions 39 for electrically connecting the island-shaped portions each other, similarly to the third embodiment. An TFD element 40 not shown is provided at the intersection of the scanning line 13 and the wiring portion 13a, and the front end of the wiring portion 13a extending in a hook shape from the TFD element 40 is increased in diameter in a circular shape in a plan view to form a contact portion 89. The contact portion 89 is disposed at the center of the island-shaped portion 31c of the pixel electrode 31. Referring to the cross-sectional structure shown in FIG. 10(b), the wiring portion 13a, the contact portion 89, etc. are formed in the inner surface side of a transparent substrate body 25A and the pixel electrode 31 is formed with an interlayer insulating film 71 covering them therebetween. The pixel electrode 31 and the wiring portion 13a (TFD element 40) are electrically connected each other by allowing the pixel electrode 31 and the contact portion 89 to be electrically connected through a contact hole 72 passing through the interlayer insulating film 71 and reaching the contact portion 89.

On the other hand, as shown in FIG. 10(c), the lower substrate 10 comprises a counter electrode 9, dielectric protrusions 73 to 75 disposed in the area in which the counter electrode 9 is formed at a predetermined interval, and light-shielding portions 88a to 88c. In the cross-sectional structure thereof, the light-shielding portions 88a to 88c are formed in the inner surface side of a transparent substrate body 10A, the counter electrode 9 is formed to cover the light-shielding portions 88a to 88c, and the dielectric protrusions 73 to 75 are formed on the counter electrode 9 at the positions two-dimensionally overlapped with the respective light-shielding portions 88a to 88c. The dielectric protrusions 73 to 75 serve as the alignment control means for controlling the alignment state of the liquid crystal molecules of a vertical alignment mode at the time of application of voltage.

Although not shown, vertical alignment films are formed on the pixel electrode 31 of the upper substrate 25 and on the counter electrode 9 and the dielectric protrusions 73 to 75 of the lower substrate 10, respectively. In the outer surface side of the upper substrate 25, a retardation plate 16 and a polarizing plate 17 are stacked sequentially from the substrate body 25A side, and in the outer surface side of the lower substrate 10, a retardation plate 18 and a polarizing plate 19 are stacked sequentially from the substrate body 10A side. A backlight 15 as illumination means is provided in the outside (rear surface side) of the lower substrate 10.

In the liquid crystal display device 400 according to the present embodiment having the above structure, since the dielectric protrusions 73 to 75 and the light-shielding portions 88a to 88c are provided on the lower substrate 10, it is possible to position the dielectric protrusions 73 to 75 and the light-shielding portions 88a to 88c with high accuracy, similarly to the third embodiment and the leaked light due to the dielectric protrusions 73 to 75 can be effectively intercepted, so that it is possible to obtain a high-contrast display. In addition, since the positioning can be performed with higher accuracy, the diameter of the light-shielding portions 88a to 88c can be reduced and the aperture ratio can be enhanced, thereby obtaining a bright display.

In the present embodiment, the light-shielding portions 88a to 88c are provided between the pixel electrode 9 and the substrate body 10A. However, when the color filter is provided in the lower substrate 10, the light-shielding portions 88a to 88c can be formed in the same step as the black matrix as the light-shielding member provided in the color filter similarly to the second embodiment, so that it is possible to realize a liquid crystal display device capable of obtaining a color display with high contrast without increasing the process load.

(Electronic Apparatus)

Next, a specific example of an electronic apparatus comprising the liquid crystal display device according to any one of the aforementioned embodiments of the present invention will be described.

Figure 11:
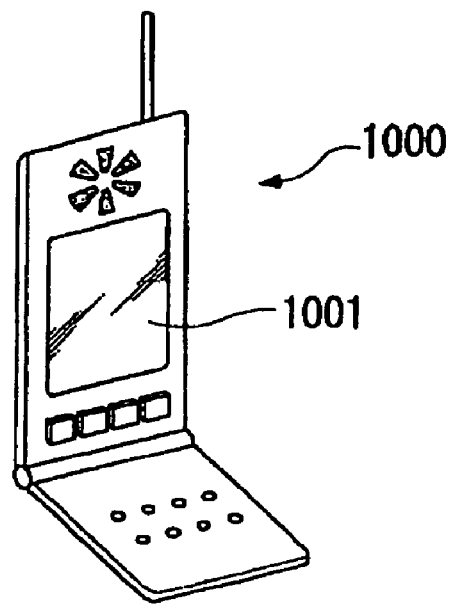
FIG. 11 is a perspective view illustrating an example of an electronic apparatus according to the present invention.

FIG. 11 is a perspective view illustrating an example of a mobile phone. In FIG. 11, a reference numeral 1000 denotes a mobile phone body and a reference numeral 1001 denotes a display unit employing the aforementioned liquid crystal display device. When the liquid crystal display device according to any one of the aforementioned embodiments is used for the display unit of an electronic apparatus such as a mobile phone, etc., it is possible to realize an electronic apparatus comprising a liquid crystal display unit which has a high contrast to accomplish a wide viewing angle and has an excellent display characteristic.

The present invention is not limited to the aforementioned embodiments but may be modified variously without departing from a gist of the present invention. For example, although examples where the present invention is applied to an active matrix liquid crystal display device using TFD as a switching element have been described in the aforementioned embodiments, the present invention may be applied to a passive matrix liquid crystal display device, etc., as well as an active matrix liquid crystal display device using TFT as a switching element.

What is claimed is:

1. A liquid crystal display device of vertical alignment mode comprising:

a pair of substrates disposed to be opposite to each other;

a liquid crystal layer, which includes liquid crystal including a negative dielectric anisotropy, disposed between the pair of substrates;

a first electrode provided at the side of the liquid crystal layer on one substrate of the pair of substrates;

an alignment control portion, provided on the one substrate, for controlling the alignment of the liquid crystal, the alignment control portion having an island shape;

a light-shielding film provided on the other substrate, the light-shielding film having an island shape corresponding to the alignment control portion, the light-shielding film is made of a metal film, and the light-shielding film being two-dimensionally overlapped with the alignment control portion and being disposed at a position corresponding to the alignment control portion; and a second electrode provided at the side of the liquid crystal layer on the other substrate of the pair of substrates by the material of a transparent conductive film, the second electrode electrically connected with the light-shielding film, the second electrode being larger than the light-shielding film, and provided in an area where the light-shielding film is completely included by the second electrode in plan view.

2. The liquid crystal display device according to claim 1, wherein the alignment control portion at least includes either a dielectric protrusion formed on the first electrode or an electrode opening portion formed by cutting out a part of the first electrode.

3. The liquid crystal display device according to claim 1, wherein the second electrode is provided directly on the light-shielding film.

* * * * *